United States Patent
Nishikawa et al.

(10) Patent No.: US 8,025,933 B2
(45) Date of Patent: *Sep. 27, 2011

(54) RETARDATION PLATE, ELLIPTICALLY POLARIZING PLATE AND LIQUID CRYSTAL DISPLAY

(75) Inventors: Hideyuki Nishikawa, Minami-ashigara (JP); Satoshi Tanaka, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 796 days.

This patent is subject to a terminal disclaimer.

(21) Appl. No.: 11/663,736

(22) PCT Filed: Sep. 27, 2005

(86) PCT No.: PCT/JP2005/018234
§ 371 (c)(1),
(2), (4) Date: Mar. 18, 2008

(87) PCT Pub. No.: WO2006/035964
PCT Pub. Date: Apr. 6, 2006

(65) Prior Publication Data
US 2008/0193679 A1 Aug. 14, 2008

(30) Foreign Application Priority Data
Sep. 27, 2004 (JP) .................. 2004-280233

(51) Int. Cl.
G02B 5/30 (2006.01)
G02F 1/1337 (2006.01)
(52) U.S. Cl. .................. 428/1.1; 428/1.31; 349/117
(58) Field of Classification Search .................. 428/1.1, 428/1.31; 252/299.01, 299.61; 349/117
See application file for complete search history.

(56) References Cited

U.S. PATENT DOCUMENTS

| | | | |
|---|---|---|---|
| 6,436,558 B1 | 8/2002 | Sato et al. | |
| 7,364,670 B2 * | 4/2008 | Nishikawa et al. | 252/299.01 |
| 7,431,971 B2 | 10/2008 | Nishikawa et al. | |
| 7,431,972 B2 | 10/2008 | Nagai et al. | |
| 7,696,353 B2 * | 4/2010 | Takahashi et al. | 548/131 |
| 7,763,181 B2 * | 7/2010 | Ikeda et al. | 252/299.01 |
| 2002/0037427 A1 | 3/2002 | Taguchi | |
| 2005/0056811 A1 * | 3/2005 | Nishikawa et al. | 252/299.01 |
| 2006/0216440 A1 | 9/2006 | Nishikawa et al. | |
| 2008/0064879 A1 | 3/2008 | Takahashi et al. | |
| 2008/0090027 A1 | 4/2008 | Li et al. | |
| 2008/0113112 A1 | 5/2008 | Ikeda et al. | |
| 2008/0193679 A1 | 8/2008 | Nishikawa et al. | |

FOREIGN PATENT DOCUMENTS

| | | |
|---|---|---|
| DE | 102 34 188 A1 | 2/2004 |
| EP | 1 156 349 A1 | 11/2001 |
| EP | 1 506 991 A2 | 2/2005 |
| JP | 7-157473 A | 6/1995 |
| JP | 7-306317 A | 11/1995 |
| JP | 11-279165 A | 10/1999 |
| JP | 11-292848 A | 10/1999 |
| JP | 11-345686 A | 12/1999 |
| JP | 2001-166147 A | 6/2001 |
| JP | 2002-20363 A | 1/2002 |
| JP | 2003-57817 A | 2/2003 |
| JP | 2003-138251 A | 5/2003 |
| JP | 2004-184864 A | 7/2004 |
| JP | 2005-338744 A | 12/2005 |
| JP | 2006-091745 A | 4/2006 |
| JP | 2006-119632 A | 5/2006 |
| JP | 4382620 B2 | 12/2009 |
| JP | 4431454 B2 | 3/2010 |

OTHER PUBLICATIONS

International Preliminary Report on Patentability for PCT/JP2005/018234 dated Mar. 27, 2007.
International Search Report for PCT/JP2005/018234 dated Sep. 27, 2005.

(Continued)

Primary Examiner — Shean Wu
(74) Attorney, Agent, or Firm — Buchanan Ingersoll & Rooney PC

(57) ABSTRACT

A retardation plate comprising at least one optically anisotropic layer, wherein at least one of said optically anisotropic layers is formed from a composition containing a liquid crystalline compound represented by the following formula:

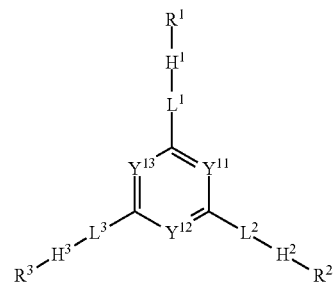

wherein $Y^{11}$, $Y^{12}$ and $Y^{13}$ are methine or N; $L^1$, $L^2$ and $L^3$ are single bond or divalent group; $H^1$, $H^2$ and $H^3$ are formula (DI-A) or (DI-B); $YA^1$, $YA^2$, $YB^1$ and $YB^2$ are methine or N; XA and XB are O, S, etc.; $R^1$, $R^2$ and $R^3$ are $-(-L^{21}-Q^2)_{n1}$-$L^{22}$-$L^{23}$-$Q^1$; $L^{21}$ is single bond or divalent group; $Q^2$ is cyclic divalent group; n1 is 0-4; $L^{22}$ is —O—, —O—CO—, etc; $L^{23}$ is —O—, —S—, etc.; $Q^1$ is polymerizable group or H.

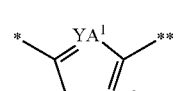

(DI-A)

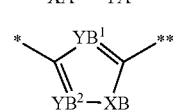

(DI-B)

18 Claims, No Drawings

OTHER PUBLICATIONS

Kim et al., "Synthesis of Novel Discotic Mesogen Containing Electron-Transportable Oxadiazole Moiety", Molecular Crystals and Liquid Crystals, vol. 370, 2001, pp. 391-394, XP008055885 (cited on p. 2 of the application).

Kim B G et al., "Star-shaped discotic nematic liquid crystal containing 1,3,5,-triethynylbenzene and oxadiazole-based rigid arms", Tetrahedron Letters, Elsevier, Amsterdam, NL, vol. 42, No. 14, Apr. 2, 2001 pp. 2697-2699 XP004231644 ISSN: 0040-4039.

Cherioux F et al., "Synthesis and characterization of an octupolar polymer and new molecular octupoles with off-resonant third order optical nonlinearities", Chemical Communications—Chemcon, Royal society of Chemistry, GB, No. 20, 1999, pp. 2083-2084, XP002261155 ISSN: 1359-7345.

Cristiano R et al., "Synthesis and Characterization of Low Molecular Mass Luminescent Liquid Crystalline Materials With 1,3,4-Oxadiazole Units", Liquid Crystals, Taylor and Francis, Abingdon, GB, vol. 32, No. 1, Jan. 2005, pp. 7-14, XP001222748 ISSN: 0267-8292 abstract; compound II.

Cristiano R et al., "Light-Emitting Bent-Shape Liquid Crystals", Liquid Crystals, Taylor and Francis, Abingdon, GB, vol. 32, No. 1, Jan. 2005, pp. 15-25, XP001222749 ISSN: 0267-8292, abstract; figure 1.

Cherioux F et al., "Synthesis and characterization of an octupolar polymer and new molecular octupoles with off-resonant third order optical nonlinearities", Chemical Communications—Chemcon, Royal society of Chemistry, GB, No. 20, 1999, pp. 2083-2084, XP002261155.

Cherioux F. et al., "Synthesis and Electrochemical Properties of new star-shaped thiophene oligomers and their polymers", Chemical Communications—Chemcom, Royal Society of Chemistry, GB, No. 20, 1998 pp. 2225-2226, XP-002261154.

J.B. Hynes et al., "Hydroxylamine Derivatives as Potential Antimalarial Agents, 3. 1,2,4-Oxadiazoles", Journal of Medicinal Chemistry, vol. 15, No. 11, 1972, pp. 1198-1200, XP-002364208.

Official Action dated Mar. 22, 2011, issued by the Japanese Patent Office in corresponding Japanese Patent Application No. 2007-533115, and translation thereof.

* cited by examiner

RETARDATION PLATE, ELLIPTICALLY POLARIZING PLATE AND LIQUID CRYSTAL DISPLAY

TECHNICAL FIELD

The present invention relates to a retardation plate having an optically anisotropic layer formed from a composition containing a liquid crystalline compound showing a low wavelength dispersion property, and also relates to an elliptically polarizing plate and a liquid display device each using the retardation plate.

BACKGROUND ART

The optically anisotropic layer is formed by aligning a discotic liquid crystalline compound (disc-like liquid crystalline compound) and fixing the aligned state. The discotic liquid crystalline compound generally has a large birefringence. Also, the discotic liquid crystalline compound has various aligning modes. When a discotic liquid crystalline compound is used, a retardation plate having optical properties unobtainable by a conventional stretched birefringent film can be produced.

In order to use the liquid crystalline compound for a retardation plate, the entire molecules constituting the optically anisotropic layer must be uniformly aligned, that is, the discotic liquid crystalline compound is preferably oriented in a monodomain alignment. However, conventional discotic liquid crystalline compounds are oriented in a dual-domain alignment and this causes generation of alignment defects at the boundary of domains. Therefore, in many cases, conventional discotic liquid crystalline compounds cannot assure optical properties necessary for the application to a retardation plate. The optical properties are dependent on the chemical structure of the discotic liquid crystalline compound. In this respect, as described in *Molecular Crystals and Liquid Crystals*, Vol. 370, page 391 (2001), many kinds of discotic liquid crystalline compounds have been studied and developed so as to obtain necessary optical properties.

However, there is a demand for a retardation plate having an optically anisotropic layer formed from a discotic liquid crystalline compound having a wavelength dispersion property lower than that of discotic liquid crystalline compounds known at present.

DISCLOSURE OF THE INVENTION

An aspect of the present invention is to solve the above-described problem and provide a retardation plate contributing to less change in the color tint of a displayed image and enlargement of the viewing angle. Another aspect of the present invention is to provide an elliptically polarizing plate and a liquid crystal display device each using the retardation plate.

The means to attain these aspects are as follows.

(1) A retardation plate comprising at least one optically anisotropic layer, wherein at least one of said optically anisotropic layers is formed from a composition containing a liquid crystalline compound represented by the following formula (DI):

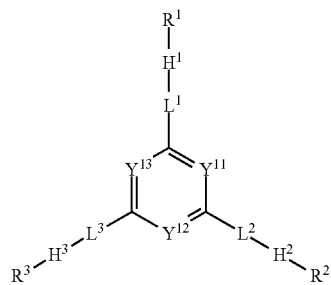

(DI)

wherein $Y^{11}$, $Y^{12}$ and $Y^{13}$ each independently represent a methine group or a nitrogen atom; $L^1$, $L^2$ and $L^3$ each independently represent a single bond or a divalent linking group; $H^1$, $H^2$ and $H^3$ each independently represent a group represented by the following formula (DI-A) or (DI-B); $R^1$, $R^2$ and $R^3$ each independently represent a group represented by the following formula (DI-R):

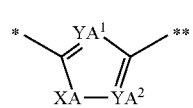

(DI-A)

wherein $YA^1$ and $YA^2$ each independently represent a methine group or a nitrogen atom; XA represents an oxygen atom, a sulfur atom, a methylene group or an imino group; * indicates the position at which the group of formula (DI-A) bonds to any of $L^1$ to $L^3$ in formula (DI); ** indicates the position at which the group of formula (DI-A) bonds to any of $R^1$ to $R^3$ in formula (DI),

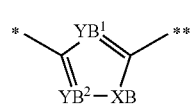

(DI-B)

wherein $YB^1$ and $YB^2$ each independently represent a methine group or a nitrogen atom; XB represents an oxygen atom, a sulfur atom, a methylene group or an imino group; * indicates the position at which the group of formula (DI-B) bonds to any of $L^1$ to $L^3$ in formula (DI); ** indicates the position at which the group of formula (DI-B) bonds to any of $R^1$ to $R^3$ in formula (DI), $$*\text{-}(\text{-}L^{21}\text{-}Q^2)_{n1}\text{-}L^{22}\text{-}L^{23}\text{-}Q^1 \quad \text{(DI-R)}$$

wherein * indicates the position at which the group of formula (DI-R) bonds to any of $H^1$ to $H^3$ in formula (DI); $L^{21}$ represents a single bond or a divalent linking group; $Q^2$ represents a divalent group having at least one cyclic structure; n1 indicates an integer of from 0 to 4; $L^{22}$ represents —O—, —O—CO—, —CO—O—, —O—CO—O—, —S—, —NH—, —SO$_2$—, —CH$_2$—, —CH=CH— or —C≡C—; ** indicates the position at which the group bonds to $Q^2$; $L^{23}$ represents a divalent linking group selected from —O—, —S—, —C(=O)—, —SO$_2$—, —NH—, —CH$_2$—, —CH=CH— and their combinations, and when the divalent linking group contains a hydrogen atom, then the hydrogen atom may be substituted with a substituent; $Q^1$ represents a polymerizable group or a hydrogen atom, and when the polymerizable group contains a hydrogen atom, then the hydrogen atom may be substituted with a substituent; when n1 is 2 or more, then plural (-$L^{21}$-$Q^2$)'s may be the same or different.

(2) The retardation plate comprising at least one optically anisotropic layer, wherein at least one of said optically anisotropic layers is formed from a composition containing a liquid crystalline compound represented by the following formula (DII):

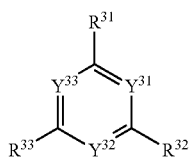
(DII)

wherein $Y^{31}$, $Y^{32}$ and $Y^{33}$ each independently represent a methine group or a nitrogen atom; $R^{31}$, $R^{32}$ and $R^{33}$ each independently represents the following formula (DII-R):

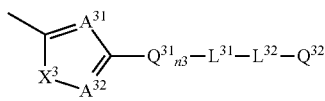
(DII-R)

wherein $A^{31}$ and $A^{32}$ each independently represent a methine group or a nitrogen atom; $X^3$ represents an oxygen atom, a sulfur atom, a methylene group or an imino group; $Q^{31}$ represents a 6-membered cyclic structure-having divalent linking group; n3 indicates an integer of from 1 to 3; $L^{31}$ represents *—O—, *—O—CO—O—, *—S—, *—NH—, *—SO$_2$—, *—CH$_2$—, *—CH=CH— or *—C≡C—; * indicates the position at which the group bonds to $Q^{31}$; $L^{32}$ represents a divalent linking group selected from —O—, —S—, —C(=O)—, —SO$_2$—, —NH—, —CH$_2$—, —CH=CH— and —C≡C— and their combinations, and when the divalent linking group contains a hydrogen atom, then the hydrogen atom may be substituted with a substituent; $Q^{32}$ represents a polymerizable group or a hydrogen atom, and when the polymerizable group contains a hydrogen atom, then the hydrogen atom may be substituted with a substituent; when n3 is 2 or more, then plural $Q^{31}$'s may be the same or different.

(3) An elliptically polarizing plate comprising the retardation plate of (1) or (2) and a polarizing film.

(4) A liquid crystal display device comprising the retardation plate of (1) or (2).

According to the present invention, a retardation plate contributing to less change in the color tint of a displayed image and enlargement of the viewing angle can be provided. Also, according to the present invention, an elliptically polarizing plate and a liquid crystal display device each realizing less change in the color tint of a displayed image and enlargement of the viewing angle can be provided.

BEST MODE FOR CARRYING OUT THE INVENTION

The retardation plate, the elliptically polarizing plate and the liquid display device of the present invention are described in detail below. In the following, the constitutional requirements are sometimes described based on a representative embodiment of the present invention, but the present invention is not limited to such an embodiment. Incidentally, in the present invention, the numerical value range expressed by using a mark "-" means a range including the numerical values before and after the mark "-" as a lower limit value and an upper limit value, respectively.

[Liquid Crystalline Compound]

The liquid crystalline compound of the present invention is represented by the following formula (DI):

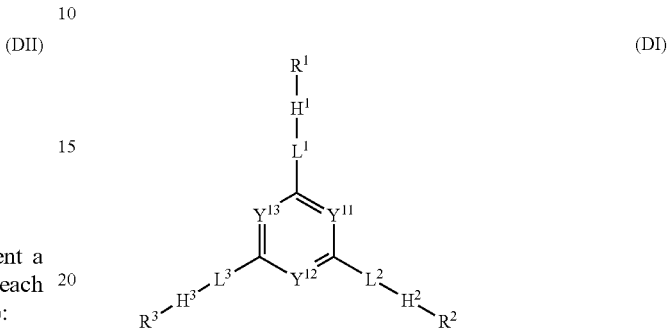
(DI)

In formula (DI), $Y^{11}$, $Y^{12}$ and $Y^{13}$ each independently represent a methine group or a nitrogen atom.

When $Y^{11}$, $Y^{12}$ and $Y^{13}$ are a methine group, then the hydrogen atom of the methine (CH) may be substituted with a substituent. Preferred examples of the substituent that the methine may have are an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom (preferably, fluorine atom, chlorine atom) and a cyano group. Of those substituents, more preferred are an alkyl group, an alkoxy group, an alkoxycarbonyl group, an acyloxy group, a halogen atom and a cyano group; and most preferred are an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group.

More preferably, $Y^{11}$, $Y^{12}$ and $Y^{13}$ are all methine groups; and most preferably, the methine for them is unsubstituted.

In formula (DI), $L^1$, $L^2$ and $L^3$ each independently represent a single bond or a divalent linking group. When $L^1$, $L^2$ and $L^3$ are a divalent linking group, then it is preferably a divalent linking group selected from —O—, —S—, —C(=O)—NR$^7$—, —CH=CH—, —C≡C—, a divalent cyclic group and their combinations. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, most preferably a hydrogen atom.

The divalent cyclic group for $L^1$, $L^2$ and $L^3$ is a divalent linking group having at least one cyclic structure (hereinafter this may be referred to as a cyclic group). The cyclic group is preferably 5-membered, 6-membered or 7-membered, more preferably 5-membered or 6-membered, most preferably 6-membered. The ring in the cyclic group may be a condensed ring. However, the ring is more preferably a single ring than a condensed ring. The ring in the cyclic group may be any of aromatic ring, aliphatic ring or heterocyclic ring. Preferred examples of the aromatic ring are benzene ring and naphthalene ring. A preferred example of the aliphatic ring is cyclohexane ring. Preferred examples of the hetero ring are pyridine ring and pyrimidine ring. More preferably, the cyclic group is an aromatic ring or hetero ring. The divalent cyclic group is more preferably a divalent linking group of a cyclic structure alone (which, however, may have a substituent), and the same shall apply hereinunder.

Of the divalent cyclic group represented by $L^1$, $L^2$ and $L^3$, the cyclic group having a benzene ring is preferably a 1,4-phenylene group. The cyclic group having a naphthalene ring is preferably a naphthalene-1,5-diyl group and a naphthalene-2,6-diyl group. The cyclic group having a cyclohexane ring is preferably a 1,4-cyclohexylene group. The cyclic group having a pyridine ring is preferably a pyridine-2,5-diyl group. The cyclic group having a pyrimidine ring is preferably a pyrimidine-2,5-diyl group.

The divalent cyclic group represented by $L^1$, $L^2$ and $L^3$ may have a substituent. The substituent includes a halogen atom (preferably, fluorine atom, chlorine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms.

Preferably, $L^1$, $L^2$ and $L^3$ are a single bond, *—O—CO—, *—CO—O—, *—CH=CH—, *-divalent cyclic group-, *—O—CO-divalent cyclic group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH— or *-divalent cyclic group-C≡C—; more preferably, a single bond, *—CH=CH—, *—CH=CH-divalent cyclic group- or *—C≡C-divalent cyclic group; most preferably a single bond. In these, * indicates the position at which the group bonds to the 6-membered ring that contains $Y^{11}$, $Y^{12}$ and $Y^{13}$ in formula (DI).

$H^1$, $H^2$ and $H^3$ each independently represent the following formula (DI-A) or (DI-B):

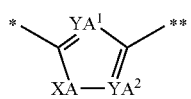

(DI-A)

In formula (DI-A), $YA^1$ and $YA^2$ each independently represent a methine group or a nitrogen atom. Preferably, at least one of $YA^1$ and $YA^2$ is a nitrogen atom; more preferably both are nitrogen atoms. XA represents an oxygen atom, a sulfur atom, a methylene group or an imino group, preferably an oxygen atom. * indicates the position at which the group bonds to any of $L^1$ to $L^3$ in formula (DI); ** indicates the position at which the group bonds to any of $R^1$ to $R^3$ in formula (DI)).

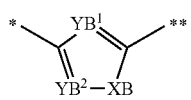

(DI-B)

In formula (DI-B), $YB^1$ and $YB^2$ each independently represent a methine group or a nitrogen atom. Preferably, at least one of $YB^1$ and $YB^2$ is a nitrogen atom; more preferably both are nitrogen atoms. XB represents an oxygen atom, a sulfur atom, a methylene group or an imino group, preferably an oxygen atom. * indicates the position at which the group bonds to any of $L^1$ to $L^3$ in formula (DI); ** indicates the position at which the group bonds to any of $R^1$ to $R^3$ in formula (DI)).

$R^1$, $R^2$ and $R^3$ each independently represent the following formula (DI-R):

$$*-(-L^{21}-Q^2)_{n1}-L^{22}-L^{23}-Q^1 \quad \text{(DI-R)}$$

In formula (DI-R), * indicates the position at which the group bonds to any of $H^1$ to $H^3$ in formula (DI).

$L^{21}$ represents a single bond or a divalent linking group. When $L^{21}$ is a divalent linking group, it is preferably a divalent linking group selected from —O—, —S—, —C(=O)—, —$NR^7$—, —CH=CH— and —C≡C— and their combinations. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, most preferably a hydrogen atom.

Preferably, $L^{21}$ is any of a single bond, *—O—CO—, *—CO—O, *—CH=CH— or *—C≡C— (in which *** indicates the position at which the group bonds to the side of * in formula (DI-R)), more preferably a single bond.

$Q^2$ represents a divalent group having at least one cyclic structure (cyclic group). The cyclic group is preferably a 5-membered, 6-membered or 7-membered cyclic group, more preferably a 5-membered or 6-membered cyclic group, most preferably a 6-membered cyclic group. The cyclic structure in the cyclic group may be a condensed ring. However, it is more preferably a single ring than a condensed ring. The ring in the cyclic group may be any of aromatic ring, aliphatic ring or heterocyclic ring. Preferred examples of the aromatic ring are benzene ring, naphthalene ring, anthracene ring and phenanthrene ring. A preferred example of the aliphatic ring is cyclohexane ring. Preferred examples of the hetero ring are pyridine ring and pyrimidine ring.

For $Q^2$, the cyclic group having a benzene ring is preferably a 1,4-phenylene group. The cyclic group having a naphthalene ring is preferably a naphthalene-1,4-diyl group, a naphthalene-1,5-diyl group, a naphthalene-1,6-diyl group, a naphthalene-2,5-diyl group, a naphthalene-2,6-diyl group and a naphthalene-2,7-diyl group. The cyclic group having a cyclohexane ring is preferably a 1,4-cyclohexylene group. The cyclic group having a pyridine ring is preferably a pyridine-2,5-diyl group. The cyclic group having a pyrimidine ring is preferably a pyrimidine-2,5-diyl group. Of those, especially preferred are a 1,4-phenylene group, a naphthalene-2,6-diyl group and a 1,4-cyclohexylene group.

$Q^2$ may have a substituent. Examples of the substituent are a halogen atom (preferably, fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, and a trifluoromethyl group.

n1 indicates an integer of from 0 to 4, preferably an integer of from 1 to 3, more preferably 1 or 2.

$L^{22}$ represents —O—, —O—CO—, —CO—O—, —O—CO—O—, —S—, —NH—, —SO$_2$—, —OH$_2$—, —CH=CH— or —C≡C—; ** indicates the position at which the group bonds to $Q^2$.

Preferably, $L^{22}$ is —O—, —O—CO—, —CO—O—, —O—CO—O—, —CH$_2$—, —CH=CH— or —C≡C—; more preferably —O—, —O—CO—, —O—CO—O— or **—CH$_2$—. When $L^{22}$ is a group containing a hydrogen atom, then the hydrogen atom may be substituted with a substituent. Preferred examples of the substituent are a halogen atom, a cyano group, a nitro group, an alkyl group having from 1 to 6 carbon atoms, a halogen-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon atoms, and an acylamino group having from 2 to 6 carbon atoms; and more preferred are a halogen atom, and an alkyl group having from 1 to 6 carbon atoms.

$L^{23}$ represents a divalent linking group selected from —O—, —S—, —C(=O)—, —SO$_2$—, —NH—, —CH$_2$—, —CH=CH— and —C≡C— and their combinations. The hydrogen atom in —NH—, —CH$_2$— and —CH=CH— may be substituted with a substituent. Preferred examples of the substituent are a halogen atom, a cyano group, a nitro group, an alkyl group having from 1 to 6 carbon atoms, a halogen-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon atoms, and an acylamino group having from 2 to 6 carbon atoms; and more preferred are a halogen atom, and an alkyl group having from 1 to 6 carbon atoms. Substituted with any of these substituents, the liquid-crystalline compound may have an increased solubility in solvents used in preparing liquid-crystalline compositions containing the compound.

Preferably, $L^{23}$ is selected from a group consisting of —O—, —C(=O)—, —CH$_2$—, —CH=CH— and —C≡C— and their combinations. More preferably, $L^{23}$ contains from 1 to 20 carbon atoms, even more preferably from 2 to 14 carbon atoms. Also preferably, $L^{23}$ contains from 1 to 16 (—CH$_2$—)s, more preferably from 1 to 12 (—CH$_2$—)s.

$Q^1$ represents a polymerizable group or a hydrogen atom. When the liquid-crystalline compound is used in optical films such as optically-compensatory films of which the retardation is desired to be unchangeable by heat, then $Q^1$ is preferably a polymerizable group. Preferably, the polymerization for the group is addition polymerization (including ring-cleavage polymerization) or condensation polymerization. Specifically, it is desirable that the polymerizable group is a functional group that may undergo addition polymerization or condensation polymerization. Examples of the polymerizable group are mentioned below.

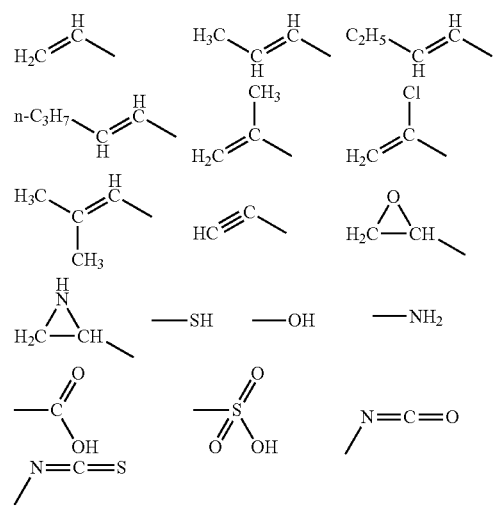

More preferably, the polymerizable group is a functional group that may undergo addition polymerization. As the polymerizable group of the type, preferred is a polymerizable ethylenic unsaturated group or a ring-cleavage polymerizable group.

Examples of the polymerizable ethylenic unsaturated group are the following formulae (M-1) to (M-6):

(M-1)

(M-2)

(M-3)

(M-4)

(M-5)

(M-6)

In formulae (M-3) and (M-4), R represents a hydrogen atom or an alkyl group, preferably a hydrogen atom or a methyl group.

Of formulae (M-1) to (M-6), preferred is formula (M-1) or (M-2), and more preferred is formula (M-1).

The ring-cleavage polymerizable group is preferably a cyclic ether group, more preferably an epoxy group or an oxetanyl group, and most preferably an epoxy group.

Among the compounds described above, preferred are those of the following formula (DII):

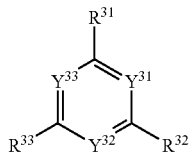
(DII)

In formula (DII), $Y^{31}$, $Y^{32}$ and $Y^{33}$ each independently represent a methine group or a nitrogen atom, and these have the same meanings as $Y^{11}$, $Y^{12}$ and $Y^{13}$ in formula (DI). Their preferred ranges are also the same as therein.

In formula (DII), $R^{31}$, $R^{32}$ and $R^{33}$ each independently represents the following formula (DII-R):

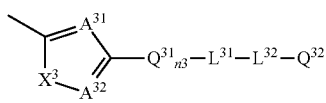
(DII-R)

In formula (DII-R), $A^{31}$ and $A^{32}$ each independently represent a methine group or a nitrogen atom. Preferably, at least one of them is a nitrogen atom, more preferably both are nitrogen atoms. $X^3$ represents an oxygen atom, a sulfur atom, a methylene group or an imino group, preferably an oxygen atom.

$Q^{31}$ represents a 6-membered cyclic structure-having divalent linking group (this may be hereinafter referred to as a 6-membered cyclic group). The 6-membered ring may be a condensed ring. However, the ring is more preferably a single ring than a condensed ring. The ring in the 6-membered cyclic group may be any of aromatic ring, aliphatic ring or heterocyclic ring. Preferred examples of the aromatic ring are benzene ring, naphthalene ring, anthracene ring and phenanthrene ring. A preferred example of the aliphatic ring is cyclohexane ring. Preferred examples of the hetero ring are pyridine ring and pyrimidine ring.

For $Q^{31}$, the 6-membered cyclic group having a benzene ring is preferably a 1,4-phenylene group. The cyclic structure having a naphthalene ring is preferably a naphthalene-1,4-diyl group, a naphthalene-1,5-diyl group, a naphthalene-1,6-diyl group, a naphthalene-2,5-diyl group, a naphthalene-2,6-diyl group and a naphthalene-2,7-diyl group. The cyclic structure having a cyclohexane ring is preferably a 1,4-cyclohexylene group. The cyclic structure having a pyridine ring is preferably a pyridine-2,5-diyl group. The cyclic structure having a pyrimidine ring is preferably a pyrimidine-2,5-diyl group. Of those, especially preferred are a 1,4-phenylene group, a naphthalene-2,6-diyl group and a 1,4-cyclohexylene group.

The cyclic structure for $Q^{31}$ may have a substituent. Examples of the substituent are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. As the substituent for the 6-membered cyclic group, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, and a trifluoromethyl group.

n3 indicates an integer of from 1 to 3, preferably 1 or 2.

$L^{31}$ represents *—O—, *—O—CO—, *—CO—O—, *—O—CO—O—, *—S—, *—N(R)—, *—CH$_2$—, *—CH=CH— or *—C≡C—; * indicates the position at which the group bonds to $Q^{31}$. Concretely, this has the same meaning as $L^{22}$ in formula (DI-R), and its preferred range is also the same as therein.

$L^{32}$ represents a divalent linking group selected from —O—, —S—, —C(=O)—, —NH—, —CH$_2$—, —CH=CH— and —C≡C— and their combinations. Concretely, this has the same meaning as $L^{23}$ in formula (DI-R), and its preferred range is also the same as therein.

In formula (DII-R), $Q^{32}$ has the same meaning as $Q^1$ in formula (DI-R).

Specific examples of the compounds of formula (DI) are mentioned below, to which, however, the invention should not be limited.

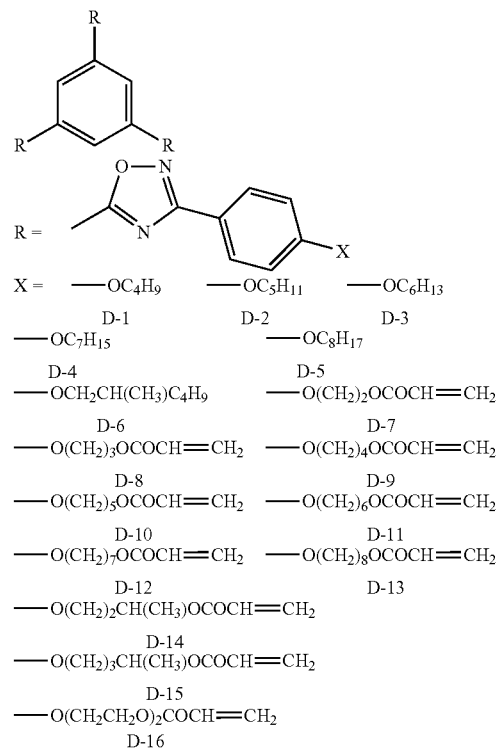

-continued

—O(CH₂)₄OCOC(CH₃)=CH₂   —O(CH₂)₄OCOCH=CHCH₃
　　　　D-17　　　　　　　　　　　　D-18
—O(CH₂)₄OCH=CH₂   —O(CH₂)₄CH(−O−)CH₂
　　D-19　　　　　　　　　D-20

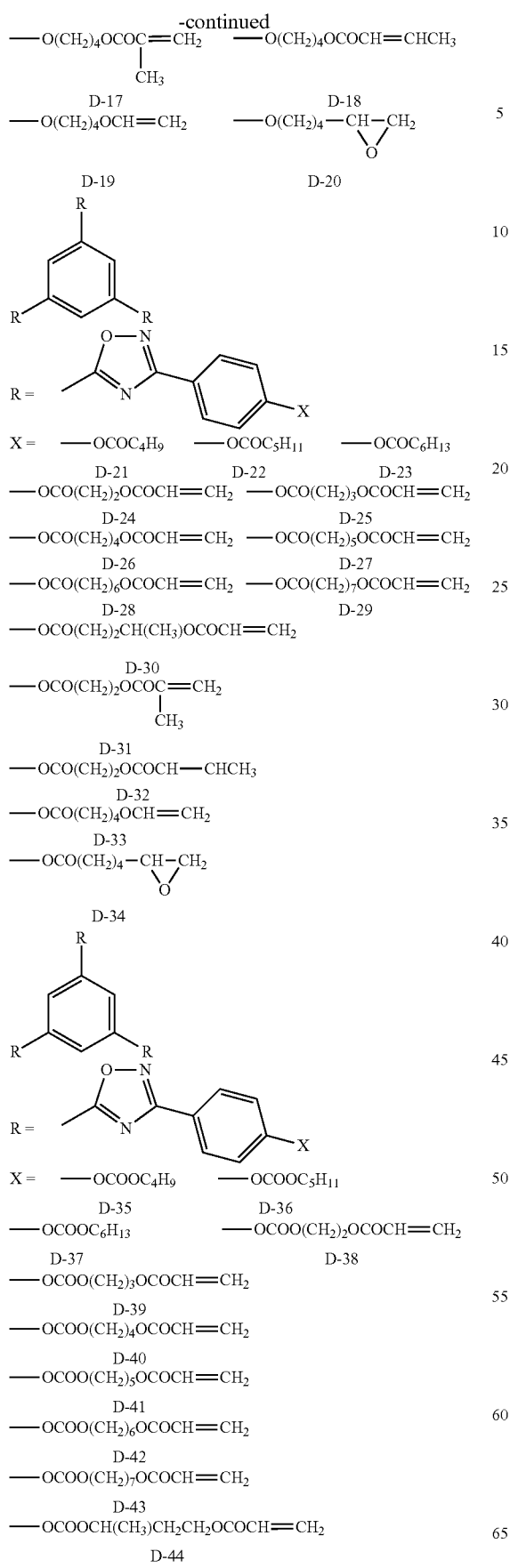

R =

X =  —OCOC₄H₉   —OCOC₅H₁₁   —OCOC₆H₁₃
　　　　D-21　　　　　D-22　　　　　D-23
—OCO(CH₂)₂OCOCH=CH₂   —OCO(CH₂)₃OCOCH=CH₂
　　　　D-24　　　　　　　　　　D-25
—OCO(CH₂)₄OCOCH=CH₂   —OCO(CH₂)₅OCOCH=CH₂
　　　　D-26　　　　　　　　　　D-27
—OCO(CH₂)₆OCOCH=CH₂   —OCO(CH₂)₇OCOCH=CH₂
　　　　D-28　　　　　　　　　　D-29
—OCO(CH₂)₂CH(CH₃)OCOCH=CH₂
　　　　　　　D-30
—OCO(CH₂)₂OCOC(CH₃)=CH₂
　　　　　D-31
—OCO(CH₂)₂OCOCH=CHCH₃
　　　　　D-32
—OCO(CH₂)₄OCH=CH₂
　　　D-33
—OCO(CH₂)₄CH(−O−)CH₂
　　　　D-34

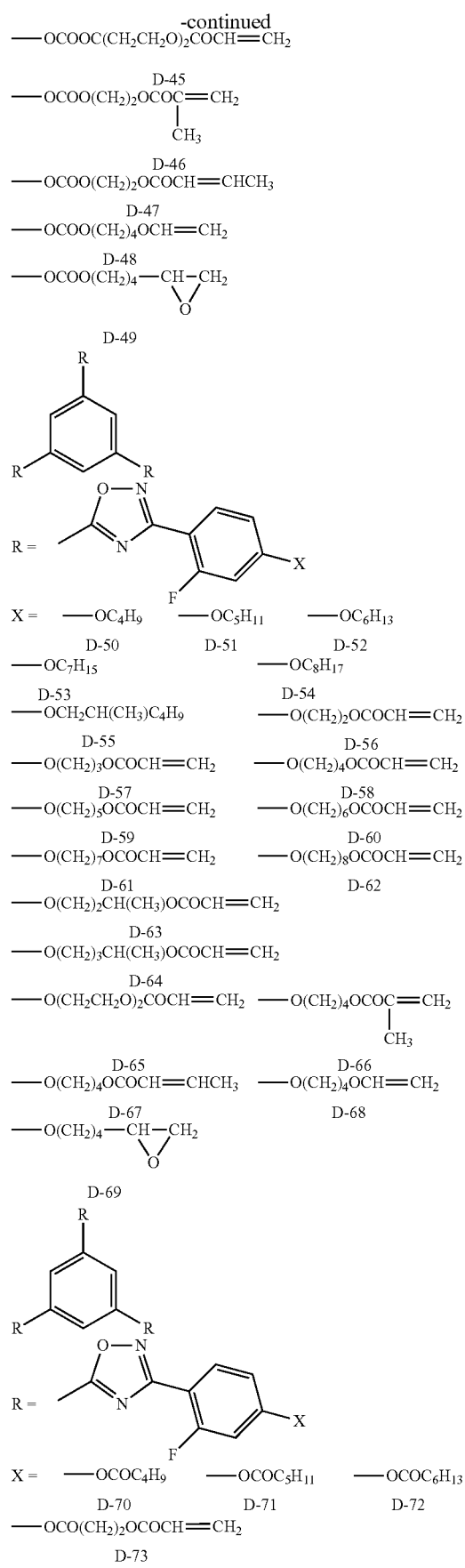

R =

X =  —OCOOC₄H₉   —OCOOC₅H₁₁
　　　　D-35　　　　　D-36
—OCOOC₆H₁₃   —OCOO(CH₂)₂OCOCH=CH₂
　　D-37　　　　　　　　D-38
—OCOO(CH₂)₃OCOCH=CH₂
　　　　D-39
—OCOO(CH₂)₄OCOCH=CH₂
　　　　D-40
—OCOO(CH₂)₅OCOCH=CH₂
　　　　D-41
—OCOO(CH₂)₆OCOCH=CH₂
　　　　D-42
—OCOO(CH₂)₇OCOCH=CH₂
　　　　D-43
—OCOOCH(CH₃)CH₂CH₂OCOCH=CH₂
　　　　　　D-44

—OCOO(CH₂CH₂O)₂COCH=CH₂
　　　　　D-45
—OCOO(CH₂)₂OCOC(CH₃)=CH₂
　　　　　D-46
—OCOO(CH₂)₂OCOCH=CHCH₃
　　　　　D-47
—OCOO(CH₂)₄OCH=CH₂
　　　D-48
—OCOO(CH₂)₄CH(−O−)CH₂
　　　　D-49

R =

X =  —OC₄H₉   —OC₅H₁₁   —OC₆H₁₃
　　　D-50　　　　D-51　　　　D-52
—OC₇H₁₅   —OC₈H₁₇
　D-53　　　　D-54
—OCH₂CH(CH₃)C₄H₉   —O(CH₂)₂OCOCH=CH₂
　　　　D-55　　　　　　　　　D-56
—O(CH₂)₃OCOCH=CH₂   —O(CH₂)₄OCOCH=CH₂
　　　　D-57　　　　　　　　　D-58
—O(CH₂)₅OCOCH=CH₂   —O(CH₂)₆OCOCH=CH₂
　　　　D-59　　　　　　　　　D-60
—O(CH₂)₇OCOCH=CH₂   —O(CH₂)₈OCOCH=CH₂
　　　　D-61　　　　　　　　　D-62
—O(CH₂)₂CH(CH₃)OCOCH=CH₂
　　　　　D-63
—O(CH₂)₃CH(CH₃)OCOCH=CH₂
　　　　　D-64
—O(CH₂CH₂O)₂COCH=CH₂   —O(CH₂)₄OCOC(CH₃)=CH₂
　　　　D-65　　　　　　　　　D-66
—O(CH₂)₄OCOCH=CHCH₃   —O(CH₂)₄OCH=CH₂
　　　　D-67　　　　　　　　　D-68
—O(CH₂)₄CH(−O−)CH₂
　　　D-69

R =

X =  —OCOC₄H₉   —OCOC₅H₁₁   —OCOC₆H₁₃
　　　D-70　　　　D-71　　　　D-72
—OCO(CH₂)₂OCOCH=CH₂
　　　D-73

-continued

—OCO(CH₂)₃OCOCH=CH₂
D-74
—OCO(CH₂)₄OCOCH=CH₂
D-75
—OCO(CH₂)₅OCOCH=CH₂
D-76
—OCO(CH₂)₆OCOCH=CH₂
D-77
—OCO(CH₂)₇OCOCH=CH₂
D-78
—OCO(CH₂)₂CH(CH₃)OCOCH=CH₂
D-79
—OCO(CH₂)₂COC(CH₃)=CH₂
D-80
—OCO(CH₂)₂OCOCH=CHCH₃
D-81
—OCO(CH₂)₄OCH=CH₂    —OCO(CH₂)₄—CH—CH₂ (epoxide)
D-82                  D-83

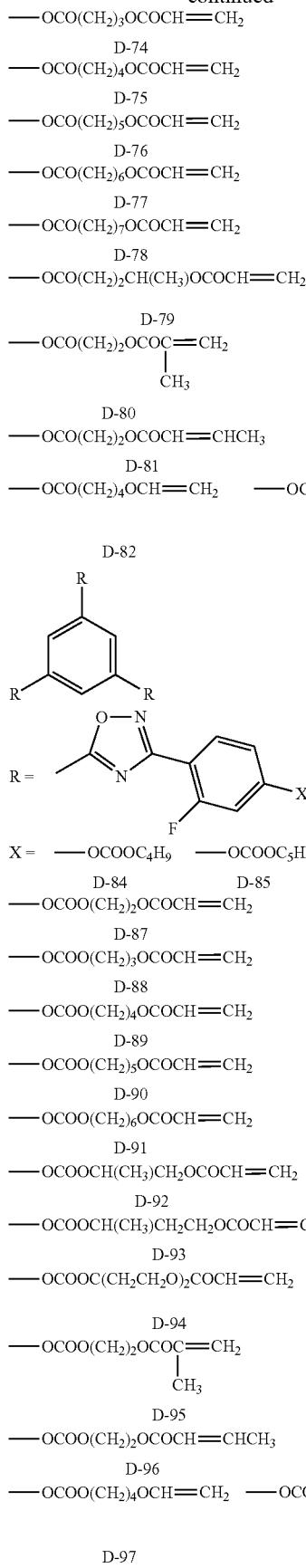

X = —OCOOC₄H₉    —OCOOC₅H₁₁    —OCOOC₆H₁₃
    D-84          D-85           D-86
—OCOO(CH₂)₂OCOCH=CH₂
D-87
—OCOO(CH₂)₃OCOCH=CH₂
D-88
—OCOO(CH₂)₄OCOCH=CH₂
D-89
—OCOO(CH₂)₅OCOCH=CH₂
D-90
—OCOO(CH₂)₆OCOCH=CH₂
D-91
—OCOOCH(CH₃)CH₂OCOCH=CH₂
D-92
—OCOOCH(CH₃)CH₂CH₂OCOCH=CH₂
D-93
—OCOOC(CH₂CH₂O)₂COCH=CH₂
D-94
—OCOO(CH₂)₂OCOC(CH₃)=CH₂
D-95
—OCOO(CH₂)₂OCOCH=CHCH₃
D-96
—OCOO(CH₂)₄OCH=CH₂    —OCOO(CH₂)₄—CH—CH₂ (epoxide)
D-97                   D-98

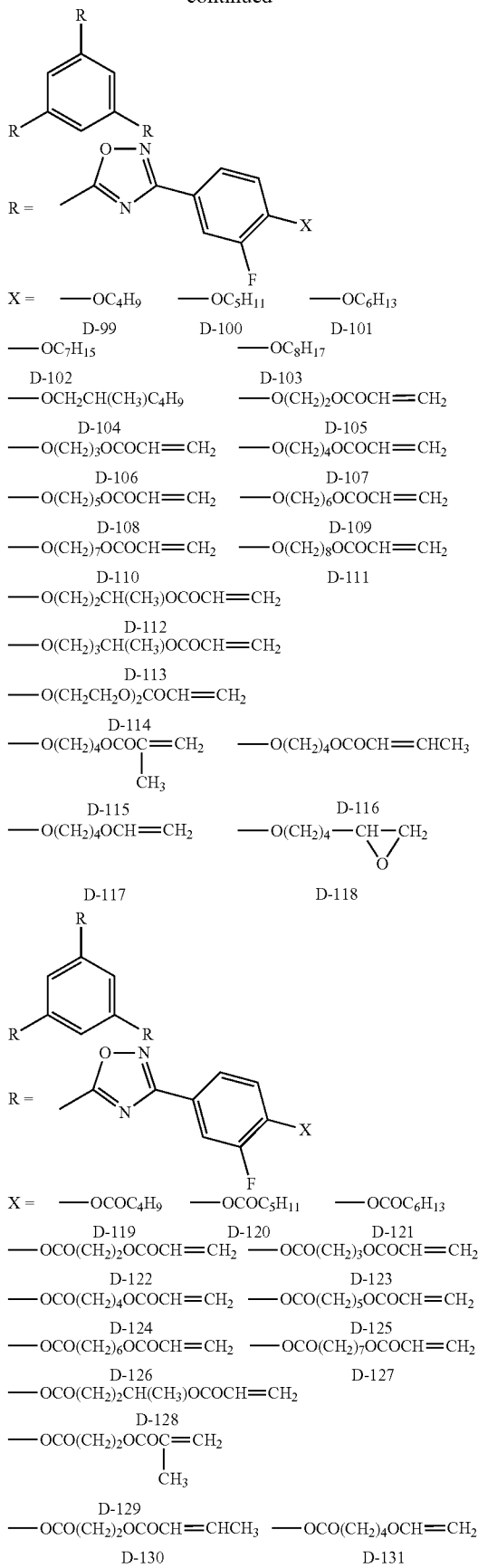

X = —OC₄H₉    —OC₅H₁₁    —OC₆H₁₃
    D-99      D-100      D-101
—OC₇H₁₅    —OC₈H₁₇
D-102      D-103
—OCH₂CH(CH₃)C₄H₉    —O(CH₂)₂OCOCH=CH₂
D-104                D-105
—O(CH₂)₃OCOCH=CH₂    —O(CH₂)₄OCOCH=CH₂
D-106                 D-107
—O(CH₂)₅OCOCH=CH₂    —O(CH₂)₆OCOCH=CH₂
D-108                 D-109
—O(CH₂)₇OCOCH=CH₂    —O(CH₂)₈OCOCH=CH₂
D-110                 D-111
—O(CH₂)₂CH(CH₃)OCOCH=CH₂
D-112
—O(CH₂)₃CH(CH₃)OCOCH=CH₂
D-113
—O(CH₂CH₂O)₂COCH=CH₂
D-114
—O(CH₂)₄OCOC(CH₃)=CH₂    —O(CH₂)₄OCOCH=CHCH₃
D-115                     D-116
—O(CH₂)₄OCH=CH₂    —O(CH₂)₄—CH—CH₂ (epoxide)
D-117               D-118

X = —OCOC₄H₉    —OCOC₅H₁₁    —OCOC₆H₁₃
    D-119        D-120         D-121
—OCO(CH₂)₂OCOCH=CH₂    —OCO(CH₂)₃OCOCH=CH₂
D-122                   D-123
—OCO(CH₂)₄OCOCH=CH₂    —OCO(CH₂)₅OCOCH=CH₂
D-124                   D-125
—OCO(CH₂)₆OCOCH=CH₂    —OCO(CH₂)₇OCOCH=CH₂
D-126                   D-127
—OCO(CH₂)₂CH(CH₃)OCOCH=CH₂
D-128
—OCO(CH₂)₂OCOC(CH₃)=CH₂
D-129
—OCO(CH₂)₂OCOCH=CHCH₃    —OCO(CH₂)₄OCH=CH₂
D-130                      D-131

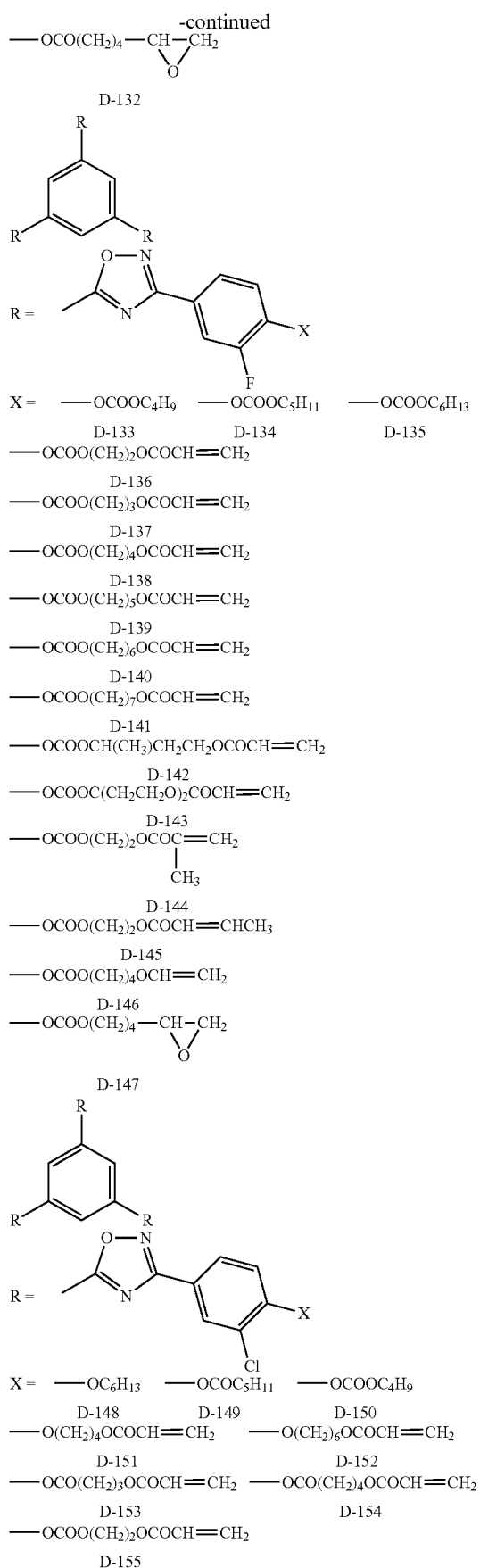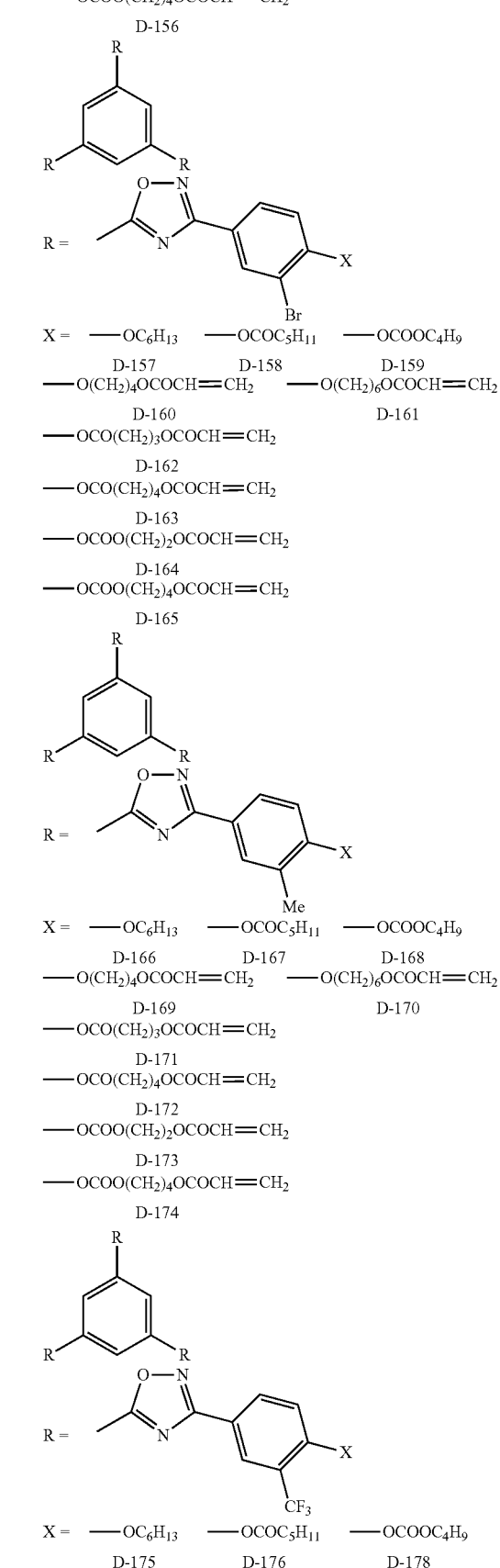

-continued

—O(CH₂)₄OCOCH=CH₂   —O(CH₂)₆OCOCH=CH₂
D-179              D-180
—OCO(CH₂)₃OCOCH=CH₂
D-181
—OCO(CH₂)₄OCOCH=CH₂
D-182
—OCOO(CH₂)₂OCOCH=CH₂
D-183
—OCOO(CH₂)₄OCOCH=CH₂
D-184

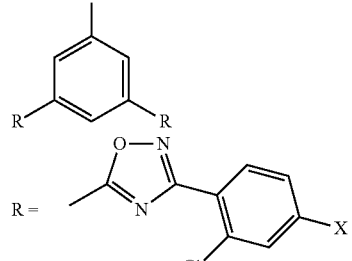

X =   —OC₆H₁₃   —OCOC₅H₁₁   —OCOOC₄H₉
      D-185       D-186        D-187
—O(CH₂)₄OCOCH=CH₂   —O(CH₂)₆OCOCH=CH₂
D-188              D-189
—OCO(CH₂)₃OCOCH=CH₂
D-190
—OCO(CH₂)₄OCOCH=CH₂
D-191
—OCOO(CH₂)₂OCOCH=CH₂
D-192
—OCOO(CH₂)₄OCOCH=CH₂
D-193

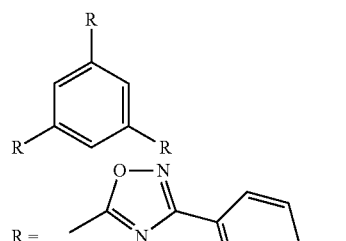

X =   —OC₆H₁₃   —OCOC₅H₁₁   —OCOOC₄H₉
      D-194       D-195        D-196
—O(CH₂)₄OCOCH=CH₂   —O(CH₂)₆OCOCH=CH₂
D-197              D-198
—OCO(CH₂)₃OCOCH=CH₂
D-199
—OCO(CH₂)₄OCOCH=CH₂
D-200
—OCOO(CH₂)₂OCOCH=CH₂
D-201
—OCOO(CH₂)₄OCOCH=CH₂
D-202

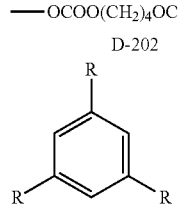

-continued

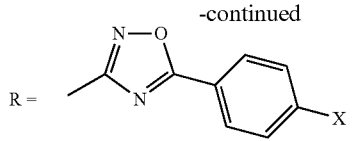

X =   —OC₆H₁₃   —OCOC₅H₁₁   —OCOOC₄H₉
      D-203       D-204        D-205
—O(CH₂)₄OCOCH=CH₂   —O(CH₂)₆OCOCH=CH₂
D-206              D-207
—OCO(CH₂)₃OCOCH=CH₂
D-208
—OCO(CH₂)₄OCOCH=CH₂
D-209
—OCOO(CH₂)₂OCOCH=CH₂
D-210
—OCOO(CH₂)₄OCOCH=CH₂
D-211

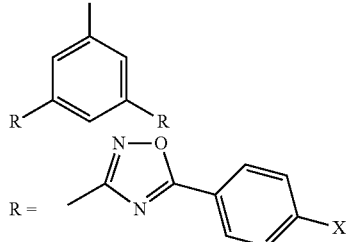

X =   —OC₆H₁₃   —OCOC₅H₁₁   —OCOOC₄H₉
      D-212       D-213        D-214
—O(CH₂)₄OCOCH=CH₂   —O(CH₂)₆OCOCH=CH₂
D-215              D-216
—OCO(CH₂)₃OCOCH=CH₂
D-217
—OCO(CH₂)₄OCOCH=CH₂
D-218
—OCOO(CH₂)₂OCOCH=CH₂
D-219
—OCOO(CH₂)₄OCOCH=CH₂
D-220

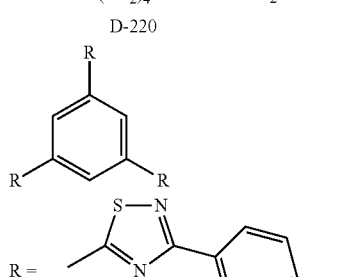

X =   —OC₆H₁₃   —OCOC₅H₁₁   —OCOOC₄H₉
      D-221       D-222        D-223
—O(CH₂)₆OCOCH=CH₂   —OCO(CH₂)₃OCOCH=CH₂
D-224              D-225
—OCOO(CH₂)₄OCOCH=CH₂
D-226

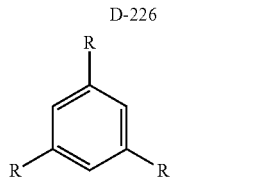

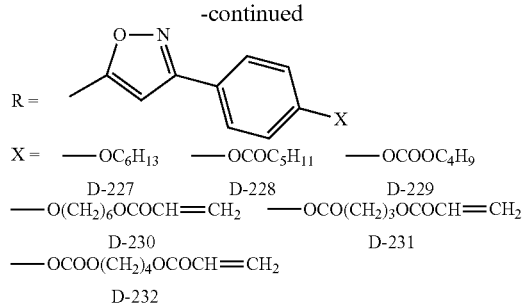
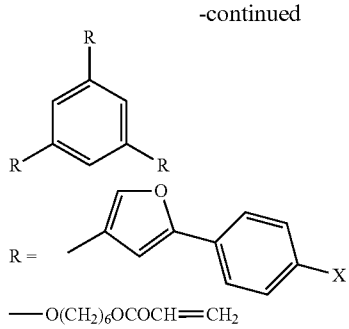

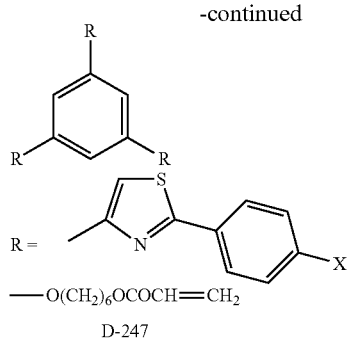
D-247
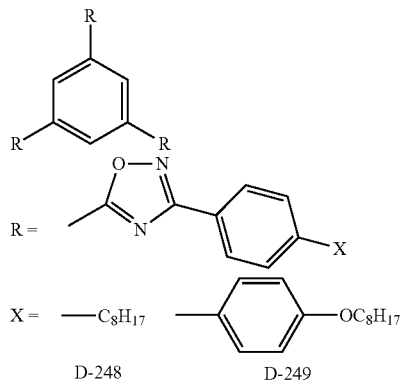
D-248   D-249
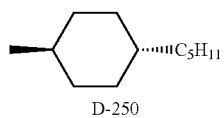
D-250
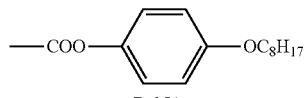
D-251
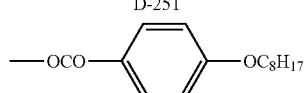
D-252
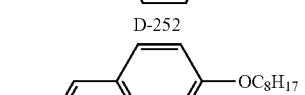
D-253
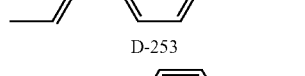
D-254
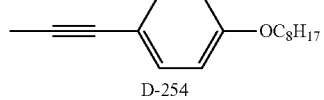
D-255
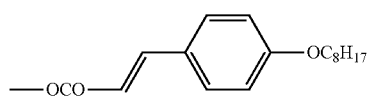
D-256   D-257
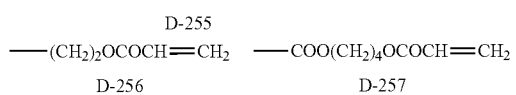
D-258
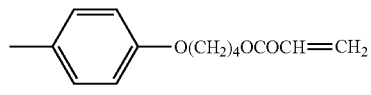
D-259
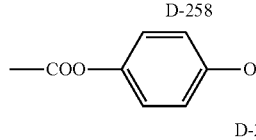
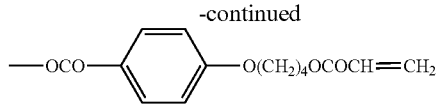
D-260
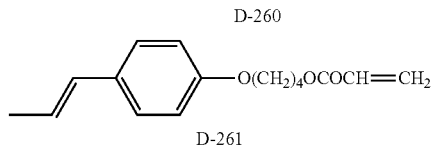
D-261
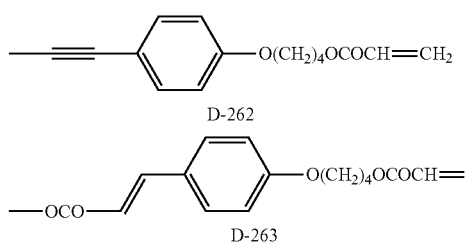
D-262
D-263
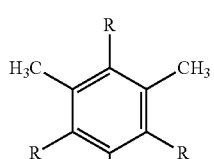
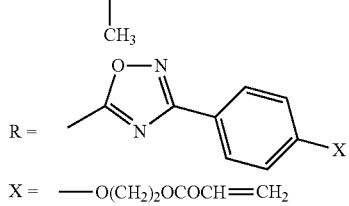
D-264
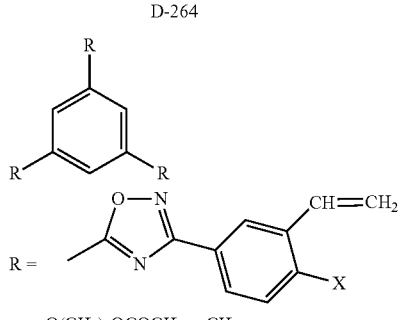
D-265
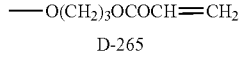
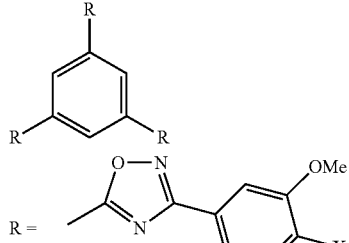
D-266
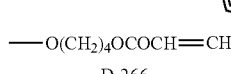
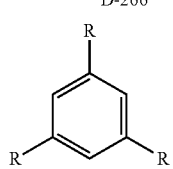

-continued
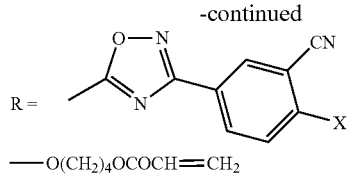
R = —O(CH₂)₄OCOCH=CH₂
D-267
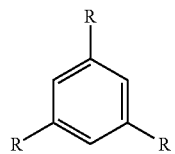
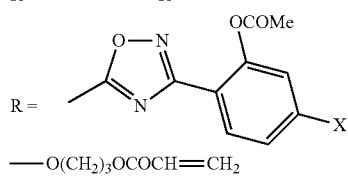
R = —O(CH₂)₃OCOCH=CH₂
D-268
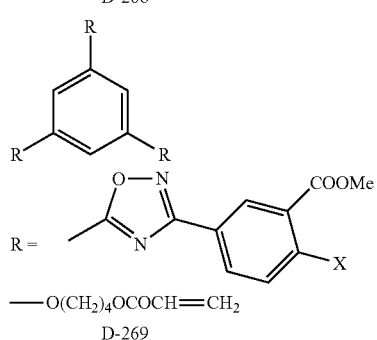
R = —O(CH₂)₄OCOCH=CH₂
D-269
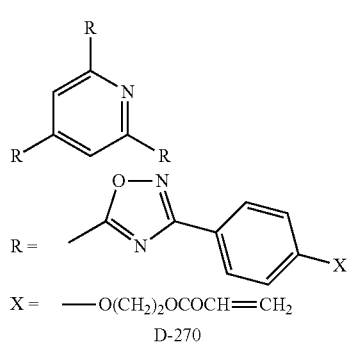
X = —O(CH₂)₂OCOCH=CH₂
D-270
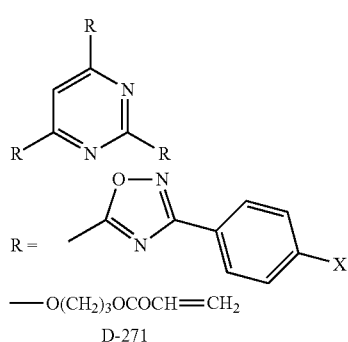
R = —O(CH₂)₃OCOCH=CH₂
D-271
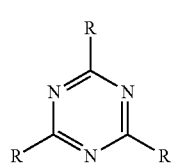
-continued
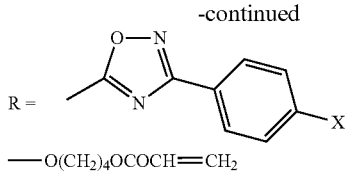
R = —O(CH₂)₄OCOCH=CH₂
D-272
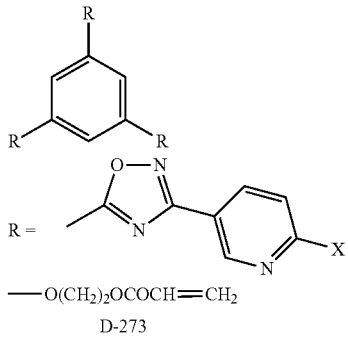
R = —O(CH₂)₂OCOCH=CH₂
D-273
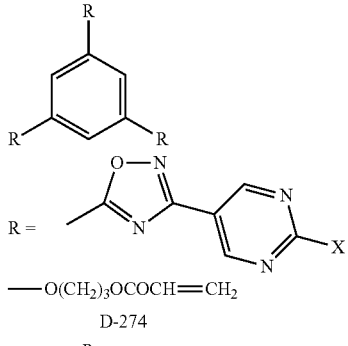
R = —O(CH₂)₃OCOCH=CH₂
D-274
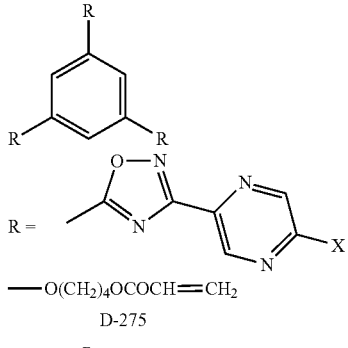
R = —O(CH₂)₄OCOCH=CH₂
D-275
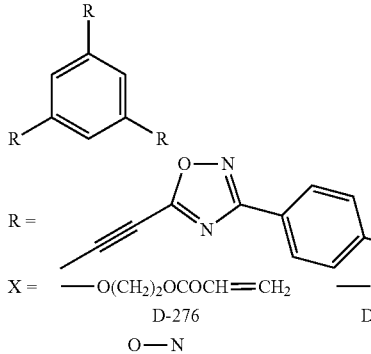
X = —O(CH₂)₂OCOCH=CH₂    —OC₆H₁₃
     D-276                D-277
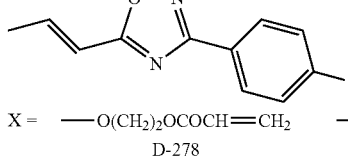
X = —O(CH₂)₂OCOCH=CH₂    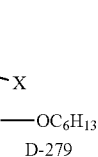—OC₆H₁₃
     D-278                D-279

-continued

X = —O(CH₂)₂OCOCH=CH₂  —OC₆H₁₃
    D-280                D-281

X = —O(CH₂)₂OCOCH=CH₂  —OC₆H₁₃
    D-282                D-283

X = —O(CH₂)₂OCOCH=CH₂  —OC₆H₁₃
    D-284                D-285

X = —O(CH₂)₂OCOCH=CH₂  —OC₆H₁₃
    D-286                D-287

X = —O(CH₂)₂OCOCH=CH₂  —OC₆H₁₃
    D-287-2              D-288

X = —O(CH₂)₂OCOCH=CH₂  —OC₆H₁₃
    D-289                D-290

X = —O(CH₂)₂OCOCH=CH₂  —OC₆H₁₃
    D-291                D-292

X = —O(CH₂)₂OCOCH=CH₂  —OC₆H₁₃
    D-293                D-294

-continued

X =  —OC₆H₁₃    —OCOC₅H₁₁    —OCOOC₄H₉
     D-295      D-296         D-297
—O(CH₂)₄OCOCH=CH₂   —O(CH₂)₆OCOCH=CH₂
     D-298               D-299
—OCO(CH₂)₃OCOCH=CH₂
     D-300
—OCO(CH₂)₄OCOCH=CH₂
     D-301
—OCOO(CH₂)₂OCOCH=CH₂
     D-302
—OCOO(CH₂)₄OCOCH=CH₂
     D-303
—OCOO(CH₂CH₂O)₂COCH=CH₂
     D-304

X =  —OC₆H₁₃    —OCOC₅H₁₁    —OCOOC₄H₉
     D-305      D-306         D-307
—O(CH₂)₄OCOCH=CH₂   —O(CH₂)₆OCOCH=CH₂
     D-308               D-309
—OCO(CH₂)₃OCOCH=CH₂
     D-310
—OCO(CH₂)₄OCOCH=CH₂
     D-311
—OCOO(CH₂)₂OCOCH=CH₂
     D-312
—OCOO(CH₂)₄OCOCH=CH₂
     D-313
—OCOO(CH₂CH₂O)₂COCH=CH₂
     D-314

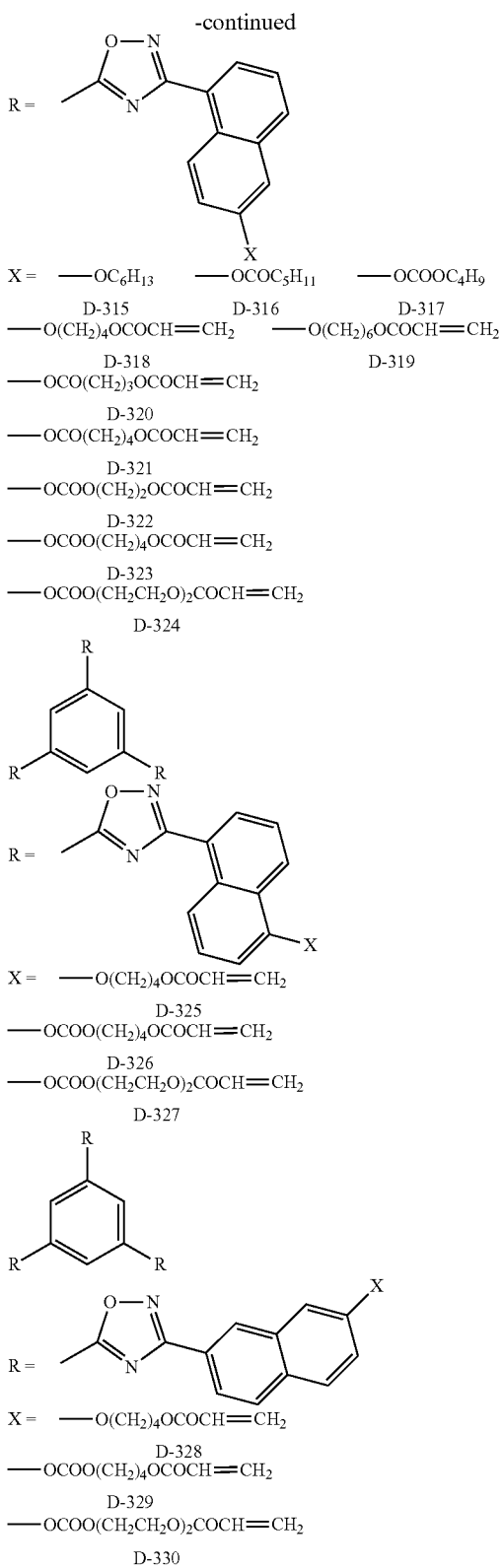

The liquid crystalline compound of the present invention preferably expresses a liquid crystal phase exhibiting a good monodomain property. By virtue of the good monodomain property, the obtained structure becomes a polydomain, as a result, generation of alignment defects at the boundary of domains and in turn scattering of light can be effectively prevented. Furthermore, when a good monodomain property is exhibited, the retardation plate can have higher light transmittance and this is preferred.

The liquid crystal phase expressed by the liquid crystalline compound for use in the present invention includes a columnar phase and a discotic nematic phase ($N_D$ phase). Of these liquid crystal phases, a discotic nematic phase ($N_D$ phase) exhibiting a good monodomain property and enabling a hybrid alignment is most preferred.

The liquid crystalline compound for use in the present invention preferably expresses a liquid crystal phase at 20 to 300° C., more preferably at 40 to 280° C. and most preferably at 60 to 250° C. The term "expresses a liquid crystal phase at 20 to 300° C." as used herein includes the case where the liquid crystal temperature range exists across 20° C. (specifically, for example, from 10 to 22° C.) or across 300° C. (specifically, for example, from 298 to 310° C.). The same applies to the range of 40 to 280° C. and the range of 60 to 250° C.

[Optically Anisotropic Layer]

The optically anisotropic layer for use in the present invention contains a state where the liquid crystalline compound for use in the present invention is aligned. Therefore, the optically anisotropic layer exhibits optical anisotropy based on the alignment of the liquid crystalline compound.

The optically anisotropic layer may be formed by using a composition containing the liquid crystalline compound for use in the present invention and additionally containing other materials such as a material contributing to the control of the alignment and a material contributing to the fixing of the aligned state. When the liquid crystalline compound employed in the present invention is once heated to a liquid phase-forming temperature and then cooled while maintaining the aligned state, the liquid crystalline compound can be fixed without impairing the alignment mode expressed in the liquid crystal state. The liquid crystalline compound employed in the present invention can also be fixed by heating the composition added with a polymerization initiator to a liquid crystal phase-forming temperature and after polymerization, cooling it. The "aligned state is fixed" as used in the present invention is not limited to a state where the alignment is maintained, though this is a most typical and preferred embodiment, but indicates a state where the layer has no fluidity, for example, in the temperature range from 0 to 50° C. and in severer conditions, from −30 to 70° C., and the fixed alignment mode can be stably maintained without causing change in the alignment mode due to external field or outer force.

Incidentally, when the aligned state is finally fixed, the liquid crystal composition need not exhibit liquid crystallinity any more. For example, in the case of using a polymerizable compound as the liquid crystalline compound, the polymerizable compound may result in having a high molecular weight and losing the liquid crystallinity as the polymerization or crosslinking reaction proceeds due to a reaction by heat, light or the like.

[Additives of Optically Anisotropic Layer]

Examples of the additive which can be added to the liquid crystalline compound used in the present invention at the formation of an optically anisotropic layer include a discotic liquid crystalline compound described in JP-A-2002-98828, and an air interface alignment controlling agent, an orientation film interface alignment controlling agent, an anti-shedding agent, a polymerization initiator and a polymerizable monomer which are described later.

The additive of the optically anisotropic layer is preferably contained in an amount of 1 to 20 mass %, most preferably from 2 to 50 mass %, based on the components constituting the optically anisotropic layer.

[Air Interface Alignment Controlling Agent]

At the air interface, the liquid crystalline compound is aligned at the tilt angle of the air interface at the air interface. The degree of this tilt angle varies depending on the kind of the liquid crystalline compound and therefore, the tilt angle at the air interface must be arbitrarily controlled according to the purpose.

This tilt angle may be controlled by using an external field such as electric field or magnetic field or by using an additive, but is preferably controlled by using an additive.

The additive for this purpose is preferably a compound containing, within the molecule, one or more, more preferably two or more, substituted or unsubstituted aliphatic group(s) having from 6 to 40 carbon atoms or substituted or unsubstituted aliphatic oligosiloxanoxy group(s) having from 6 to 40 carbon atoms. For example, the hydrophobic excluded volume effect compound described in JP-A-2002-20363 can be preferably used as the air interface alignment controlling agent.

The amount added of the additive for controlling the alignment on the air interface side is preferably from 0.001 to 20 massa, more preferably from 0.01 to 10 mass %, and most preferably from 0.1 to 5 mass %, based on the liquid crystalline compound.

[Orientation Film Interface Alignment Controlling Agent]

At the orientation film interface, the liquid crystalline compound is aligned at the tilt angle of the orientation film interface. The degree of this tilt angle varies depending on the kind of the liquid crystalline compound and therefore, the tilt angle at the orientation film interface must be arbitrarily controlled according to the purpose.

This tilt angle may be controlled by using an external field such as electric field or magnetic field or by using an additive, but is preferably controlled by using an additive.

The additive for this purpose is preferably a compound having a polar group within the molecule. Examples of the compound having a polar group include compounds having, within the molecule, —OH, —NH$_2$, —COOH, —SO$_3$H or an onium salt. Specific examples thereof include the additives described in JP-A-2004-101920.

The amount of the additive added for controlling the alignment on the orientation film interface side is preferably from 0.001 to 10 mass %, more preferably from 0.005 to 5 mass %, and most preferably from 0.01 to 2 mass %, based on the liquid crystalline compound for use in the present invention.

[Anti-Shedding Agent]

As for the material added to the liquid crystalline compound for use in the present invention and used for preventing the shedding at the coating of the composition, in general, a polymer compound can be suitably used. The polymer used is not particularly limited as long as it does not seriously change the tilt angle of the liquid crystalline compound for use in the present invention or inhibit the alignment of the compound.

Examples of the polymer include those described in JP-A-8-95030, and specific examples of particularly preferred polymers include cellulose esters. Examples of the cellulose ester include cellulose acetate, cellulose acetate propionate, hydroxypropylcellulose and cellulose acetate butyrate. In order not to inhibit the alignment of the liquid crystalline compound for use in the present invention, the amount of the polymer added for preventing the shedding is preferably from 0.1 to 10 mass %, more preferably from 0.1 to 8 mass %, still more preferably from 0.1 to 5 mass %, based on the discotic liquid crystalline compound.

[Polymerization Initiator]

The liquid crystalline compound employed in the present invention is preferably fixed in a monodomain alignment, that is, in a substantially uniform alignment. For this purpose, when a polymerizable liquid crystalline compound is used, the liquid crystalline compound is preferably fixed by the polymerization reaction. The polymerization reaction includes a thermal polymerization reaction using a thermal polymerization initiator, a photopolymerization reaction using a photopolymerization initiator, and a polymerization reaction by the irradiation of an electron beam, but in order to prevent the support or the like from deformation or deterioration due to heat, a photopolymerization reaction and a polymerization reaction by the irradiation of an electron beam are preferred. Examples of the photopolymerization initiator include an α-carbonyl compound (described in U.S. Pat. Nos. 2,367,661 and 2,367,670), an acyloin ether (described in U.S. Pat. No. 2,448,828), an α-hydrocarbon-substituted aromatic acyloin compound (described in U.S. Pat. No. 2,722,512), a polynuclear quinone compound (described in U.S. Pat. Nos. 3,046,127 and 2,951,758), a combination of triarylimidazole dimer and p-aminophenyl ketone (described in U.S. Pat. No. 3,549,367), an acridine or phenazine compound (described in JP-A-60-105667 and U.S. Pat. No. 4,239,850), and an oxadiazole compound (described in U.S. Pat. No. 4,212,970). The amount of the photopolymerization initiator used is preferably from 0.01 to 20 mass %, more preferably from 0.5 to 5 mass %, based on the solid content of the coating solution. The light irradiation for the polymerization of liquid crystalline compound is preferably performed by using an ultraviolet ray. The irradiation energy is preferably from 10 mJ/m$^2$ to 50 J/cm$^2$, more preferably from 50 to 800 mJ/cm$^2$. In order to accelerate the photopolymerization reaction, the light irradiation may be performed under heating. The oxygen concentration in the atmosphere participates in the polymerization degree and therefore, when a desired polymerization degree is not achieved in air, the oxygen concentration is preferably decreased by nitrogen purging or the like. The oxygen concentration is preferably 10% or less, more preferably 7% or less, and most preferably 3% or less.

[Polymerizable Monomer]

The polymerizable monomer used together with the liquid crystalline compound employed in the present invention is not particularly limited as long as it has compatibility with the liquid crystalline compound employed in the present invention and does not seriously change the tilt angle of the liquid crystalline compound employed in the present invention or inhibit the alignment of the compound. Among these polymerizable monomers, preferred is a compound having a polymerization-active ethylenically unsaturated group such as vinyl group, vinyloxy group, acryloyl group and methacryloyl group. The amount of the polymerizable monomer added is preferably from 0 to 30 mass %, more preferably from 0 to 20 mass %, based on the liquid crystalline compound. Also, when a monomer having two or more reactive functional groups is used, an effect of enhancing the adhesion between the orientation film and the optically anisotropic layer may be provided and this is particularly preferred.

[Coating Method]

The optically anisotropic layer is formed by preparing a coating solution of liquid crystal composition with use of the following solvent and then coating the solution, for example, on an orientation film to align the liquid crystalline compound. The coating solution can be coated by a known method (e.g., wire bar coating, extrusion coating, direct gravure coating, reverse gravure coating, die coating).

[Coating Solvent]

The solvent used for the preparation of the liquid crystal composition is preferably an organic solvent. Examples of the organic solvent include an amide (e.g., N,N-dimethylformamide), a sulfoxide (e.g., dimethylsulfoxide), a heterocyclic compound (e.g., pyridine), a hydrocarbon (e.g., toluene, hexane), an alkyl halide (e.g., chloroform, dichloromethane), an ester (e.g., methyl acetate, butyl acetate), a ketone (e.g., acetone, methyl ethyl ketone, methyl isobutyl ketone, cyclohexanone) and an ether (e.g., tetrahydrofuran, 1,2-dimethoxyethane). Among these, an alkyl halide, an ester and a ketone are preferred. Two or more organic solvents may be used in combination.

[Orientation Film]

The optically anisotropic layer for use in the present invention contains a state where the liquid crystalline compound for use in the present invention is aligned. The liquid crystalline compound may be aligned, for example, by a method using an external field such as electric field or magnetic field or by a method using an orientation film, but in the present invention, an orientation film is preferably used.

The orientation film can be provided by a method such as rubbing of an organic compound (preferably, a polymer), oblique vapor deposition of an inorganic compound, formation of a layer having microgrooves, or accumulation of an organic compound (e.g., ω-tricosanoic acid, methyl stearate) according to a Langmuir-Blodgett (LB film) method. Furthermore, an orientation film capable of exerting the aligning function upon application of an electric or magnetic field or irradiation with light is also known.

The orientation film may be any layer as long as it can impart a desired alignment to the liquid crystalline compound of the optically anisotropic layer provided on the orientation film, but in the present invention, the orientation film is preferably formed by rubbing or irradiation with light, more preferably by the rubbing of a polymer. The rubbing can be generally performed by rubbing the polymer layer surface with paper or cloth several times in a constant direction, but in the present invention, the rubbing is preferably performed by the method described in *Ekisho Binran* (*Handbook of Liquid Crystal*), Maruzen. The thickness of the orientation film is preferably from 0.01 to 10 μm, more preferably from 0.05 to 3 μm.

Incidentally, after the liquid crystalline compound is aligned by using an orientation film and the liquid crystalline compound is fixed in the aligned state as-is to form an optically anisotropic layer, only the optically anisotropic layer may be transferred onto a polymer film (or a support (transparent support)). The liquid crystalline compound fixed in its aligned state can maintain the aligned state even without an orientation film. Accordingly, the orientation film is not essential for the retardation plate (though the orientation film is essential in the production of the retardation plate).

For aligning the liquid crystalline compound, a polymer (a normal polymer for alignment) of adjusting the surface energy of the orientation film is used. As for the kind of the polymer, this is specifically described in various publications regarding a liquid crystal cell or a retardation plate. No matter what orientation film is used, the orientation film preferably has a polymerizable group for the purpose of improving the adhesion between the liquid crystalline compound and the transparent support. The polymerizable group may be introduced by introducing a repeating unit having a polymerizable group on the side chain or may be introduced as a substituent of a cyclic group. An orientation film of forming a chemical bond with the liquid crystalline compound at the interface is preferred, and such an orientation film is described in JP-A-9-152509.

[Rubbing Density of Orientation Film]

The rubbing density of the orientation film and the tilt angle of the liquid crystalline compound at the interface with the orientation film have a relationship such that as the rubbing density is increased, the tilt angle becomes smaller, whereas as the rubbing density is decreased, the tilt angle becomes larger. Therefore, the tilt angle at the orientation film interface is adjusted in many cases by varying the rubbing density of the orientation film. The rubbing density of the orientation film can be varied by the method described in *Ekisho Binran* (*Handbook of Liquid Crystal*), edited by Ekisho Binran Henshu Iinkai, Maruzen (2000). More specifically, the rubbing density (L) is quantified by formula (A):

$$L = Nl\{1+(2\pi rn/60v)\} \quad \text{Formula (A):}$$

wherein N is the number of rubbings, l is the contact length of the rubbing roller, r is the radius of the roller, n is the rotation number (rpm) of the roller, and v is the stage moving speed (per second). The rubbing density may be elevated by increasing the number of rubbings, the contact length of the rubbing roller, the radius of the roller or the rotation number of the roller or by decreasing the stage moving speed. On the other hand, the rubbing density may be lowered by reversing the increase or decrease of these factors.

[Aligned State]

In the case of using the retardation plate in a liquid crystal display mode such as TN (twisted nematic), the optically anisotropically layer for use in the present invention is preferably fixed in a state such that the discotic nematic phase is hybrid-aligned. The hybrid alignment as used herein means a state where the tilt angle of the liquid crystalline compound is continuously changed in the film thickness direction.

The liquid crystalline compound is coated on a support (preferably on an orientation film) and then caused to express a liquid crystal phase, for example, under heating. Therefore, the liquid crystalline compound at the interface on the support side is aligned at the tilt angle of the support surface or the interface with a film on which the liquid crystalline compound is coated (when an orientation film is provided, the orientation film interface) (in other words, the liquid crystalline compound is aligned at an angle made between the direction of support surface and the direction of discotic plane of the liquid crystalline compound), and the liquid crystalline compound at the interface with air is aligned at the tilt angle of the air interface.

In the present invention, the average tilt angle (the angle made between the direction of transparent support surface and the direction of discotic plane of the liquid crystalline compound) of the optically anisotropic layer is preferably from 10 to 70°, more preferably from 20 to 60°.

As for the tilt angles at respective interfaces, a combination of a tilt angle of 0 to 50° at the air interface and a tilt angle of 20 to 90° at the interface on the support side, or a combination of a tilt angle of 0 to 50° at the interface on the support side and a tilt angle of 20 to 90° at the air interface is preferred. In particular, a combination of a tilt angle of 0 to 40° at the air interface and a tilt angle of 40 to 80° at the interface on the support side, or a combination of a tilt angle of 0 to 40° at the interface on the support side and a tilt angle of 40 to 80° at the air interface is more preferred.

[Retardation Plate]

The retardation plate comprises, for example, a transparent support and an optically anisotropic layer formed by using the discotic liquid crystalline compound according to the present invention. The optically anisotropic layer can be produced by coating a composition containing the liquid crystalline compound for use in the present invention and, if desired, containing other additives on an orientation film, and fixing it while keeping the alignment expressed in the liquid crystal state. Incidentally, after the aligned state of the liquid crystalline compound is fixed on the orientation film, the optically anisotropic layer may be transferred to another support. The liquid crystalline compound fixed in the aligned state can maintain the aligned state even without the orientation film. Accordingly, the retardation plate may not have an orientation film. The thickness of the optically anisotropic layer is preferably from 0.1 to 10 μm, more preferably from 0.2 to 5 and most preferably from 0.5 to 3 μm.

[Support]

The retardation plate may have a support, and the support is preferably a transparent support. The material for the support is not particularly limited as long as it mainly exhibits optical isotropy and ensures a light transmittance of 80% or more, but a polymer film is preferred. Specific examples of the polymer include cellulose esters (e.g., cellulose diacetate, cellulose triacetate), norbornene-based polymers and poly(meth)acrylate esters, and a film thereof is used. Many commercially available polymers can be suitably used. Among these, in view of the optical performance, cellulose esters are preferred, and lower fatty acid esters of cellulose are more preferred. The lower fatty acid means a fatty acid having 6 or less carbon atoms, and the number of carbon atoms is preferably 2, 3 or 4. Specific examples thereof include cellulose acetate, cellulose propionate and cellulose butyrate. Among these, cellulose triacetate is more preferred. A mixed fatty acid ester such as cellulose acetate propionate and cellulose acetate butyrate may also be used. Furthermore, even in the case of conventionally known polymers of readily expressing birefringence, such as polycarbonate and polysulfone, those reduced in this expression by modifying the molecule described in International Publication No. WO00/26705 can be used.

The cellulose ester which is preferably used as the transparent support is described in detail below.

The cellulose ester is preferably a cellulose acetate having an acetylation degree of 55.0 to 62.5%, more preferably from 57.0 to 62.0%. The acetylation degree means the amount of acetic acid bonded per unit mass of cellulose. The acetylation degree is determined according to the Measurement and Calculation of Acetylation Degree described in ASTM: D-817-91 (Test Method of Cellulose Acetate, etc.). The viscosity average polymerization degree (DP) of cellulose ester is preferably 250 or more, more preferably 290 or more. The cellulose ester for use in the present invention preferably has a narrow molecular weight distribution Mw/Mn (Mw is a mass average molecular weight, and Mn is a number average molecular weight) as measured by gel permeation chromatography. Specifically, the Mw/Mn value is preferably from 1.0 to 1.7, more preferably from 1.3 to 1.65, and most preferably from 1.4 to 1.6.

In the cellulose ester, the hydroxyl groups at the 2-, 3- and 6-positions of cellulose are not evenly distributed in ⅓ portions of the entire substitution degree, but the substitution degree of hydroxyl group at the 6-position tends to be small. The substitution degree of hydroxyl group at the 6-position of cellulose is preferably larger than those at the 2- and 3-positions. The hydroxyl group at the 6-position is preferably substituted by an acyl group at a ratio of 30 to 40%, more preferably 31% or more, still more preferably 32% or more, based on the entire substitution degree. The substitution degree at the 6-position is preferably 0.88 or more. The hydroxyl group at the 6-position may be substituted by an acetyl group having 3 or more carbon atoms (e.g., propionyl, butyryl, valeroyl, benzoyl, acryloyl) other than an acetyl group. The substitution degree at each position can be determined by NMR. Cellulose esters having a high substitution degree of hydroxyl group at the 6-position can be synthesized by referring to the methods described in JP-A-11-5851, that is, Synthesis Example 1 (paragraphs 0043 to 0044), Synthesis Example 2 (paragraphs 0048 to 0049) and Synthesis Example 3 (paragraphs 0051 to 0052).

In the polymer film used as the support, particularly in the cellulose acetate film, an aromatic compound having at least two aromatic rings may be used as a retardation increasing agent so as to adjust the retardation value. In the case of using such a retardation increasing agent, the retardation increasing agent is preferably used in an amount of 0.01 to 20 parts by mass, more preferably from 0.05 to 15 parts by mass, still more preferably from 0.1 to 10 parts by mass, per 100 parts by mass of the cellulose acetate. Two or more aromatic compounds may be used in combination as the retardation increasing agent. The aromatic ring of the aromatic compound as used herein includes an aromatic hydrocarbon ring and an aromatic heterocyclic ring.

The aromatic hydrocarbon ring is preferably a 6-membered ring (namely, benzene ring). The aromatic heterocyclic ring is generally an unsaturated heterocyclic ring. The aromatic heterocyclic ring is preferably a 5-, 6- or 7-membered ring, more preferably a 5- or 6-membered ring. The aromatic heterocyclic ring generally has a largest number of double bonds. The heteroatom is preferably a nitrogen atom, an oxygen atom or a sulfur atom, more preferably a nitrogen atom. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. The aromatic ring is preferably a benzene ring, a furan ring, a thiophene ring, a pyrrole ring, an oxazole ring, a thiazole ring, an imidazole ring, a triazole ring, a pyridine ring, a pyrimidine ring, a pyrazine ring or a 1,3,5-triazine ring, more preferably a benzene ring or a 1,3,5-triazine ring. The aromatic compound preferably contains at least one 1,3,5-triazine ring.

The number of aromatic rings in the aromatic compound is preferably from 2 to 20, more preferably from 2 to 12, still more preferably from 2 to 8, and most preferably from 2 to 6. The bonding relationship of two aromatic rings can be classified into (a) a case where two aromatic rings form a condensed ring, (b) a case where two aromatic rings are directly bonded by a single bond, and (c) a case where two aromatic rings are bonded through a linking group (a Spiro bond cannot be formed because the rings are an aromatic ring). The bonding relationship may be any one of (a) to (c). Such a retardation increasing agent is described, for example, in International Publication Nos. WO01/88574 (pamphlet) and WO00/2619 (pamphlet), JP-A-2000-111914, JP-A-2000-275434 and Japanese Patent Application No. 2002-70009.

The cellulose acetate film is preferably produced from a prepared cellulose acetate solution (dope) by a solvent casting method. In the dope, the above-described retardation increasing agent may be added. The dope is cast on a drum or a band, and the solvent is evaporated to form a film. The concentration of the dope before casting is preferably adjusted to give a solid content of 18 to 35%. The surface of the drum or band is preferably finished to a mirror state. The casting and drying methods in the solvent casting method are described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 (the term "JP-B" as used herein means an "examined Japanese patent publication"), JP-B-49-5614, JP-A-60-176834, JP-A-60-203430 and JP-A-62-115035. The dope is preferably cast on a drum or band at a surface temperature of 10° C. or less. After the casting, the dope is preferably dried with air for 2 seconds or more. The obtained film is peeled off from the drum or band, and the film may further be dried with hot air by sequentially varying the temperature to from 100° C. to 160° C. to remove the residual solvent. This method is described in JP-B-5-17844. According to this method, the time from casting until peeling can be shortened. For practicing this method, it is necessary that the dope is gelled at the surface temperature of the drum or band on casting.

The dope is prepared by dissolving raw material flakes in a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether). A representative example of the solvent for dissolving the cellulose acylate is dichloromethane, but in view of global environment or working environment, the solvent preferably contains substantially no halogenated hydrocarbon such as dichloromethane. The term "contain substantially no halogenated hydrocarbon" as used herein means that the percentage of halogenated hydrocarbon in the organic solvent is less than 5 mass % (preferably less than 2 mass %). The cellulose acylate film containing substantially no halogenated hydrocarbon such as dichloromethane, and the production method thereof are described in *JIII Journal of Technical Disclosure*, No. 2001-1745 issued on Mar. 15, 2001 (hereinafter simply referred to as "Technical Disclosure No. 2001-1745").

In forming the film by using the prepared cellulose acetate solution (dope), the dope may also be cast in two or more layers. The dope is cast on a drum or a band and the solvent is evaporated to form a film. The concentration of the dope before casting is preferably adjusted to give a solid content of 10 to 40%. The surface of the drum or band is preferably finished to a mirror state in advance. In the case of casting a plurality of cellulose acetate solutions, the film may be produced by casting respective cellulose acetate-containing solutions from a plurality of casting ports provided with spacing in the traveling direction of support and thereby stacking the layers. For example, the methods described in JP-A-61-158414, JP-A-1-122419 and JP-A-11-198285 can be used. Furthermore, the film may be formed by casting cellulose acetate solutions from two casting ports and for example, the methods described in JP-B-60-27562, JP-A-61-94724, JP-A-61-947245, JP-A-61-104813, JP-A-61-158413 and JP-A-6-134933 can be used. In addition, a method for casting a cellulose acetate film described in JP-A-56-162617 may also be used, where a flow of a high-viscosity cellulose acetate solution is wrapped with a low-viscosity cellulose acetate solution and the high-viscosity and low-viscosity cellulose acetate solutions are simultaneously extruded.

The cellulose acetate film may further be stretched to adjust the retardation value. The stretch percentage is preferably from 0 to 100%. In the case of stretching the cellulose acetate film for use in the present invention, tenter stretching is preferably used and in order to control the slow axis with high precision, the difference in, for example, speed between right and left tenter clips or timing of disengagement is preferably reduced as small as possible.

In the cellulose ester film, a plasticizer may be added so as to improve the mechanical properties or increase the drying speed. A phosphoric acid ester or a carboxylic acid ester is used as the plasticizer. Examples of the phosphoric acid ester include triphenyl phosphate (TPP) and tricresyl phosphate (TCP). As for the carboxylic acid ester, a phthalic acid ester and a citric acid ester are representative. Examples of the phthalic acid ester include dimethyl phthalate (DMP), diethyl phthalate (DEP), dibutyl phthalate (DBP), dioctyl phthalate (DOP), diphenyl phthalate (DPP) and di-2-ethylhexyl phthalate (DEHP). Examples of the citric acid ester include triethyl o-acetylcitrate (OACTE) and tributyl o-acetylcitrate (OACTB). Other examples of the carboxylic acid ester include butyl oleate, methylacetyl ricinoleate, dibutyl sebacate and various trimellitic acid esters. Among these, phthalic ester-based plasticizers (DMP, DEP, DBP, DOP, DPP, DEHP) are preferred, and DEP and DPP are more preferred. The amount of the plasticizer added is preferably from 0.1 to 25 mass %, more preferably from 1 to 20 mass %, and most preferably 3 to 15 mass %, based on the amount of cellulose ester.

In the cellulose ester film, a deterioration inhibitor (e.g., antioxidant, peroxide decomposer, radical inhibitor, metal inactivating agent, oxygen scavenger, amines) or an ultraviolet inhibitor may be added. The deterioration inhibitor is described in JP-A-3-199201, JP-A-5-1907073, JP-A-5-194789, JP-A-5-271471 and JP-A-6-107854. The amount of the deterioration inhibitor added is preferably from 0.01 to 1 mass %, more preferably from 0.01 to 0.2 mass %, based on the solution (dope) prepared. If the amount added is less than 0.01 mass %, the effect of deterioration inhibitor can be hardly obtained, whereas if the amount added exceeds 1 mass %, the deterioration inhibitor sometimes bleeds out onto the film surface. Examples of particularly preferred deterioration inhibitors include butyrated hydroxytoluene (BHT). The ultraviolet inhibitor is described in JP-A-7-11056.

The cellulose acetate film is preferably subjected to a surface treatment. Specific examples thereof include a corona discharge treatment, a glow discharge treatment, a flame treatment, an acid treatment, an alkali treatment and an ultraviolet irradiation treatment. It is also preferred to provide an undercoat layer as described in JP-A-7-333433. In these treatments, from the standpoint of keeping the planarity of film, the temperature of cellulose acetate film is preferably set to Tg (glass transition temperature) or less, specifically, 150° C. or less.

In view of adhesion to the orientation film or the like, the surface treatment of the cellulose acetate film is preferably an acid treatment or an alkali treatment, namely, a saponification treatment for cellulose acetate.

The surface treatment is described in detail below by referring to the alkali saponification treatment as an example.

The alkali saponification treatment is preferably performed by a cycle consisting of dipping of the film surface in an alkali solution, neutralization with an acidic solution, washing with water and drying. Examples of the alkali solution include a potassium hydroxide solution and a sodium hydroxide solution. The normality of hydroxide ion is preferably from 0.1 to 3.0 N, more preferably from 0.5 to 2.0 N. The temperature of the alkali solution is preferably from room temperature (for example, 25° C.) to 90° C., more preferably from 40 to 70° C.

The surface energy of the cellulose acetate film is preferably 55 mN/m or more, more preferably from 60 to 75 mN/m.

The thickness of the cellulose acetate film is preferably from 5 to 500 μm, more preferably from 20 to 250 still more preferably from 30 to 180 μm, and most preferably from 30 to 110 μm.

The retardation plate can be used for an elliptically polarizing plate by combining it with a polarizing film. Furthermore, when applied in combination with a polarizing film to a transmission-type, reflection-type or transflective liquid crystal display device, the retardation plate contributes to the enlargement of viewing angle. The elliptically polarizing plate and the liquid crystal display device each using the retardation plate are described below.

[Elliptically Polarizing Plate]

An elliptically polarizing plate can be produced by laminating a retardation plate and a polarizing film. By the use of the retardation plate, an elliptically polarizing plate capable of enlarging the viewing angle of a liquid crystal display device can be provided. The polarizing film includes an iodine-type polarizing film, a dye-type polarizing film using a dichroic dye, and a polyene-type polarizing film. The iodine-type polarizing film and the dye-type polarizing film are generally produced by using a polyvinyl alcohol-based film. The polarization axis of the polarizing film corresponds to the direction perpendicular to the stretching direction of the film.

The polarizing film is laminated on the optically anisotropic layer side of the retardation plate. On the surface of the polarizing film opposite the side laminated with the retardation plate, a transparent protective film is preferably formed. The transparent protective film preferably has a light transmittance of 80% or more. As for the transparent protective film, a cellulose ester film is generally used, and a triacetyl cellulose film is preferred. The cellulose ester film is preferably formed by a solvent casting method. The thickness of the transparent protective film is preferably from 20 to 500 more preferably from 50 to 200 μm.

[Liquid Crystal Display Device]

By the use of the retardation plate utilizing the discotic liquid crystalline compound for use in the present invention, a liquid crystal display device enlarged in the viewing angle can be provided. The liquid crystal display device usually comprises a liquid crystal cell, a polarizing element and a retardation plate (optical compensatory sheet). The polarizing element generally comprises a polarizing film and a protective film. As for the polarizing film and the protective film, those described above regarding the elliptically polarizing plate can be used. The retardation plate (optical compensatory sheet) for TN-mode liquid crystal cells is described in JP-A-6-214116, U.S. Pat. Nos. 5,583,679 and 5,646,703 and German Patent Publication No. 3911620A1. Also, the retardation plate for IPS-mode or FLC-mode liquid crystal cells is described in JP-A-10-54982, the retardation plate for OCB-mode or HAN-mode liquid crystal cells is described in U.S. Pat. No. 5,805,253 and International Publication No. WO96/37804, the retardation plate for STN-mode liquid crystal cells is described in JP-A-9-26572, and the retardation plate for VA-mode liquid crystal cells is described in Japanese Patent No. 2,866,372.

In the present invention, the retardation plate (optical compensatory sheet) for liquid crystal cells in various modes can be produced by referring to these patent publications. The retardation plate can be used for liquid crystal display devices in various display modes such as TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and HAN (hybrid aligned nematic) mode. The retardation plate is particularly effective for the optical compensation of liquid crystal display devices in the TN (twisted nematic) and OCB (optically compensatory bend) modes.

The present invention is described in greater detail below by referring to Examples. The materials, amounts used, ratios, and contents and procedures of processing employed in the following Examples can be appropriately changed without departing from the scope of the present invention. Accordingly, the scope of the present invention is not limited to these specific examples.

The discotic liquid crystalline compound represented by formula (DI) can be synthesized according to the following Synthesis Examples.

EXAMPLE 1

Synthesis Example 1

Synthesis of D-38

(Synthesis of D-3):
D-3 was synthesized according to the following scheme.

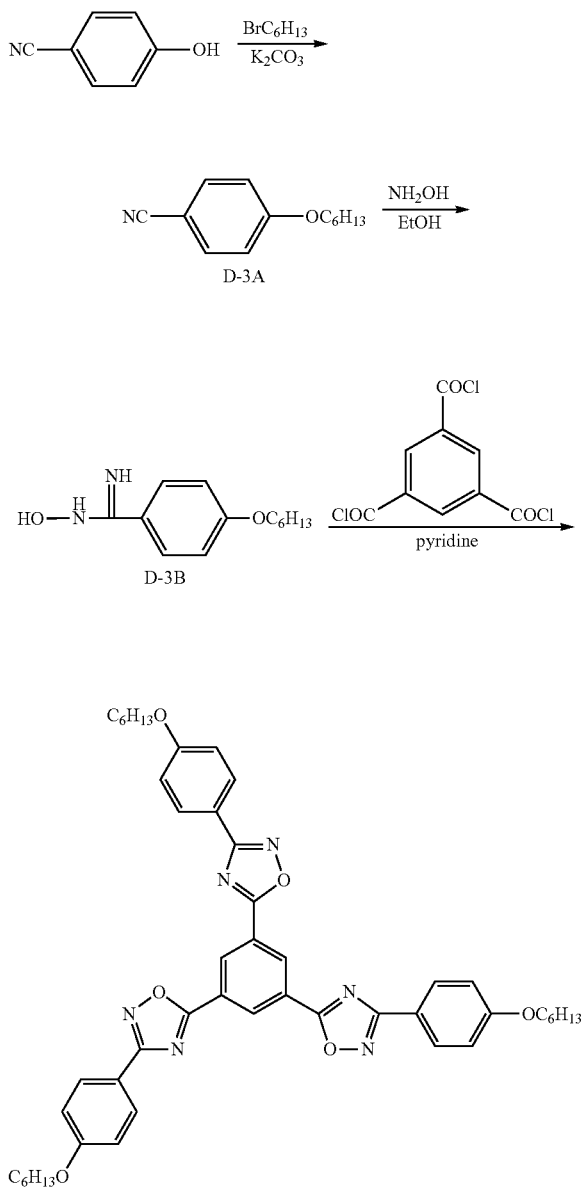

D-3

(Synthesis of D-3A)

4-Cyanophenol (15.0 g) was dissolved in 300 ml of dimethylformamide and after adding thereto 20.9 g of potassium carbonate and 18.5 ml of 1-bromohexane, the solution was stirred at 110° C. for 5 hours in a nitrogen atmosphere. Water was added to the reaction solution and then the reaction product was extracted with ethyl acetate and washed with saturated brine. The organic layer was concentrated under reduced pressure and purified by column chromatography to obtain 25.0 g of D-3A.

(Synthesis of D-3B)

D-3A (25.0 g) prepared above was dissolved in 200 ml of methanol and after adding thereto 26.0 ml of a 50% hydroxylamine solution, the solution was stirred at 90° C. for 3 hours. The reaction solution was cooled, methanol was added thereto, and then the precipitated crystal was separated by filtration and dried to obtain 29.0 g of crystal of D-3B.

(Synthesis of D-3)

D-3B (29.0 g) prepared above was dissolved in 300 ml of 1,4-dioxane and after adding thereto 10.2 g of trimesic acid chloride and 10.9 ml of pyridine, the solution was stirred at 90° C. for 7 hours. The reaction solution was cooled, methanol was added thereto, and then the precipitated crystal was collected by filtration and purified by column chromatography to obtain 25 g of D-3. The NMR spectrum of D-3 obtained was as follows.

$^1$H-NMR (solvent: $CDCl_3$, standard: tetramethylsilane) δ (ppm):
0.85 (9H, t)
1.25-1.35 (12H, m)
1.35-1.45 (6H, m)
1.70-1.80 (6H, m)
3.95 (6H, t)
6.95 (6H, d)
8.05 (6H, d)
9.10 (3H, s)

The phase transition temperature of D-3 obtained was examined by the texture observation through a polarizing microscope. First, when the temperature was elevated, the phase was changed from crystal phase to isotropic liquid phase in the vicinity of 139° C. Then, the temperature was gradually lowered from 139° C., as a result, the phase was changed to discotic nematic phase in the vicinity of 123° C. When the temperature was lowered to 98° C., the phase was changed again to crystal phase. That is, D-3 was found to express a discotic nematic phase between 123° C. and 98° C. at the temperature dropping.

(Conversion from D-3 to D-38)
D-38 was synthesized according to the following scheme.

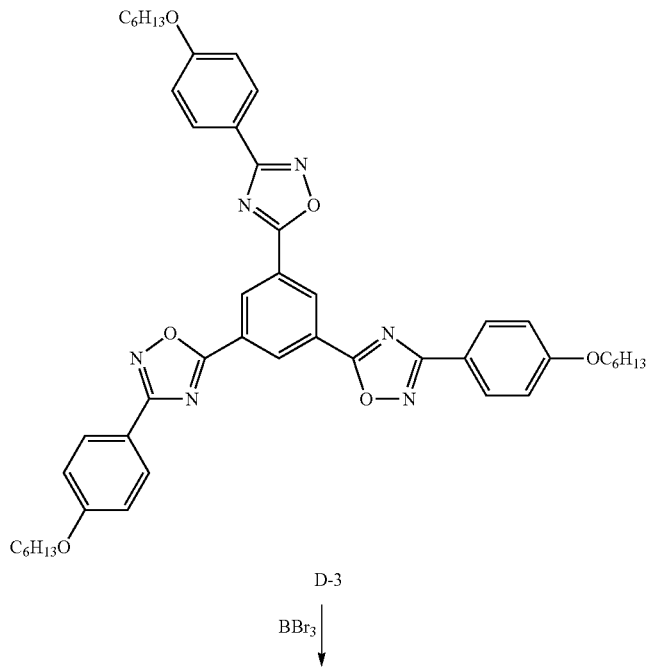

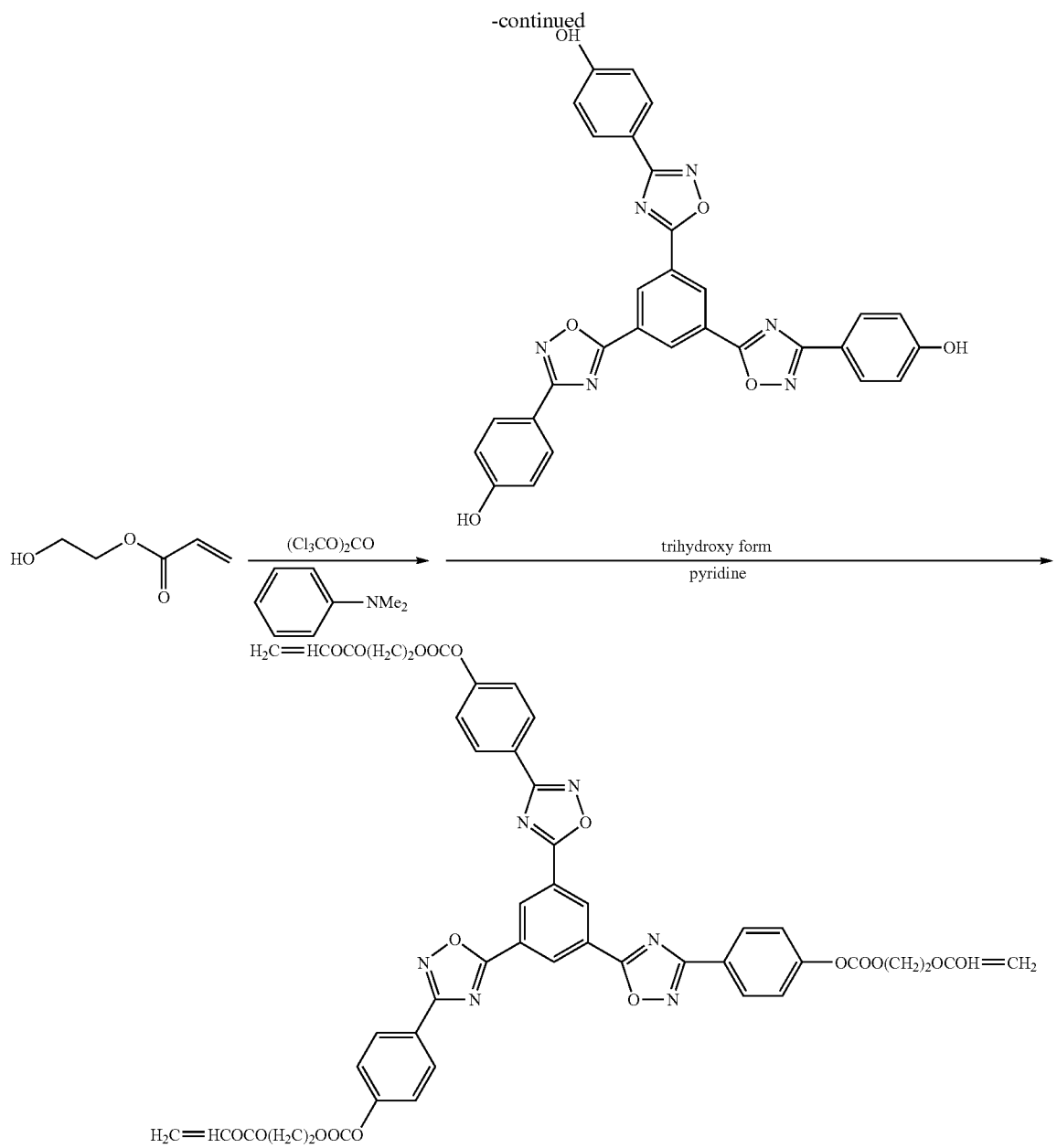

D-38

D-3 (11.0 g) synthesized above was dissolved in 100 ml of $CH_2Cl_2$, and 135 ml of boron tribromide (a 1.0 M $CH_2Cl_2$ solution) was added thereto. After stirring at 40° C. for 8 hours, water was added to the reaction solution and the precipitated crystal was collected by filtration. The obtained crystal was dried to obtain 7.5 g of a trihydroxy form.

Subsequently, 0.73 g of 2-hydroxyethyl acrylate was dissolved in 10 ml of tetrahydrofuran, then 0.84 ml of dimethylaniline was added dropwise under ice cooling, and 0.62 g of triphosgene was further added thereto. The temperature was returned to room temperature and after stirring for 2 hours, 0.35 of the trihydroxy form was added thereto under ice cooling, then 0.31 ml of pyridine was added dropwise, and the resulting solution was stirred at room temperature for 2 hours. After the completion of reaction, methanol was added and the precipitated crystal was collected by filtration and purified by column chromatography to obtain 0.38 g of D-38. The NMR spectrum of D-38 obtained was as follows.

$^1$H-NMR (solvent: $CDCl_3$, standard: tetramethylsilane) δ (ppm):
4.40-4.60 (12H, m)
5.90 (3H, dd)
6.20 (3H, dd)
6.50 (3H, dd)
7.45 (6H, d)
8.30 (6H, d)
9.30 (3H, s)

The phase transition temperature of D-38 obtained was examined by the texture observation through a polarizing microscope. First, when the temperature was elevated, the phase was changed from crystal phase to isotropic liquid phase in the vicinity of 114° C. Then, the temperature was gradually lowered from 114° C., as a result, the phase was changed to discotic nematic phase in the vicinity of 94° C. When the temperature was lowered to room temperature, the phase was changed again to crystal phase. That is, D-38 was found to express a discotic nematic phase between 94° C. and room temperature at the temperature dropping.

Production 1 of Optically Anisotropic Layer (Liquid Crystalline Compound D-38):

An aqueous solution of PVA-203 (produced by Kuraray Co., Ltd.) was coated on a glass substrate and dried at 100° C. for 3 minutes. The thickness of PVA-203 was 0.5 μm. The following coating solution was spin-coated on this substrate having provided thereon a PVA-203 thin film, and then the substrate was placed in a thermostatic chamber at 120° C. and then cooled to 70° C. After 5 minutes, an ultraviolet ray of 600 mJ was irradiated to fix the aligned state. Subsequently, the thin film was allowed to cool to room temperature and the aligned state thereof was observed by a polarizing microscope, as a result, it was found that the discotic liquid crystalline compound was oriented in a homeotropic alignment without defects. The thickness of the liquid crystalline compound layer was 3.0 μm. The wavelength dispersion property and Δn of the obtained optically anisotropic layer are shown together in Table 1 below.

| (Coating Solution) | |
|---|---|
| Liquid Crystalline Compound D-38 | 100 parts by mass |
| Air Interface Alignment Controlling Agent V-(1) shown below | 0.2 parts by mass |
| Irgacure 907 (produced by Ciba Specialty Chemicals) | 3.0 parts by mass |
| Diethylthioxanthone | 1.0 part by mass |
| Methyl ethyl ketone | 250 parts by mass |

Air Interface Alignment Controlling Agent V-(1):

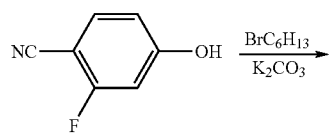

EXAMPLE 2

Synthesis Example 2

Synthesis of D-89

(Synthesis of D-52):

D-52 was synthesized according to the following scheme.

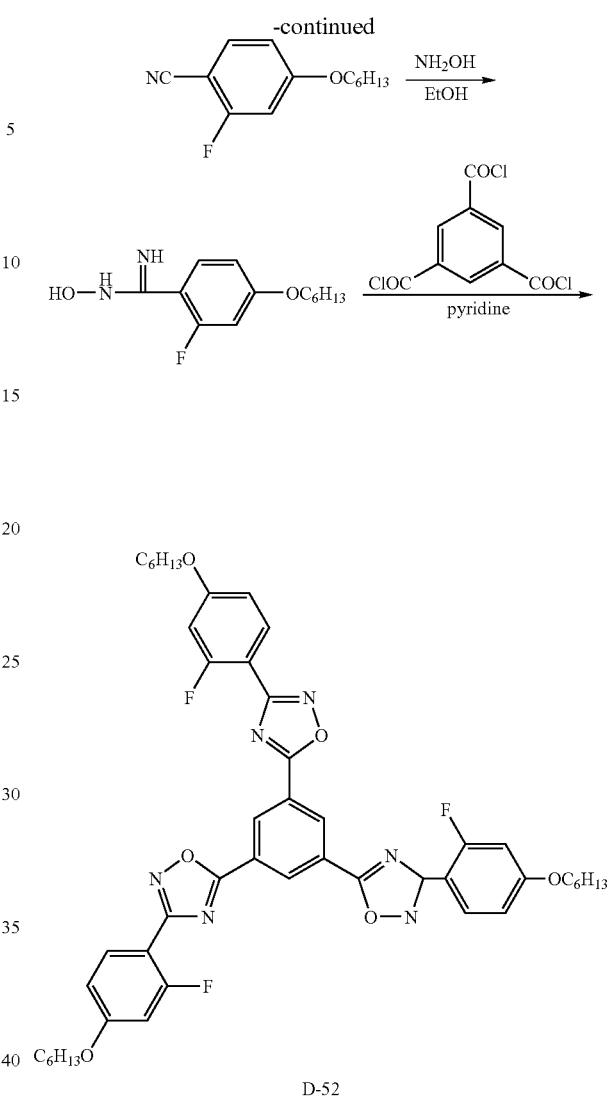

D-52

A synthesis was performed in the same manner as in Synthesis Example 1 to obtain 35 g of D-52.

$^1$H-NMR (solvent: CDCl$_3$, standard: tetramethylsilane) δ (ppm):

0.85 (9H, t)

1.25-1.35 (12H, m)

1.35-1.45 (6H, m)

1.70-1.80 (6H, m)

4.10 (6H, t)

6.80 (3H, dd)

6.90 (3H, dd)

8.15 (3H, t)

9.20 (3H, s)

The phase transition temperature of D-52 obtained was examined by the texture observation through a polarizing microscope, as a result, the phase was changed from crystal phase to discotic nematic liquid phase in the vicinity of 141° C. in the course of elevation of the temperature and when the temperature exceeded 142° C., the phase was changed to isotropic liquid phase. That is, D-52 was found to express a discotic nematic liquid phase between 141° C. and 142° C.

(Conversion from D-52 to D-89)
D-89 was synthesized according to the following scheme.
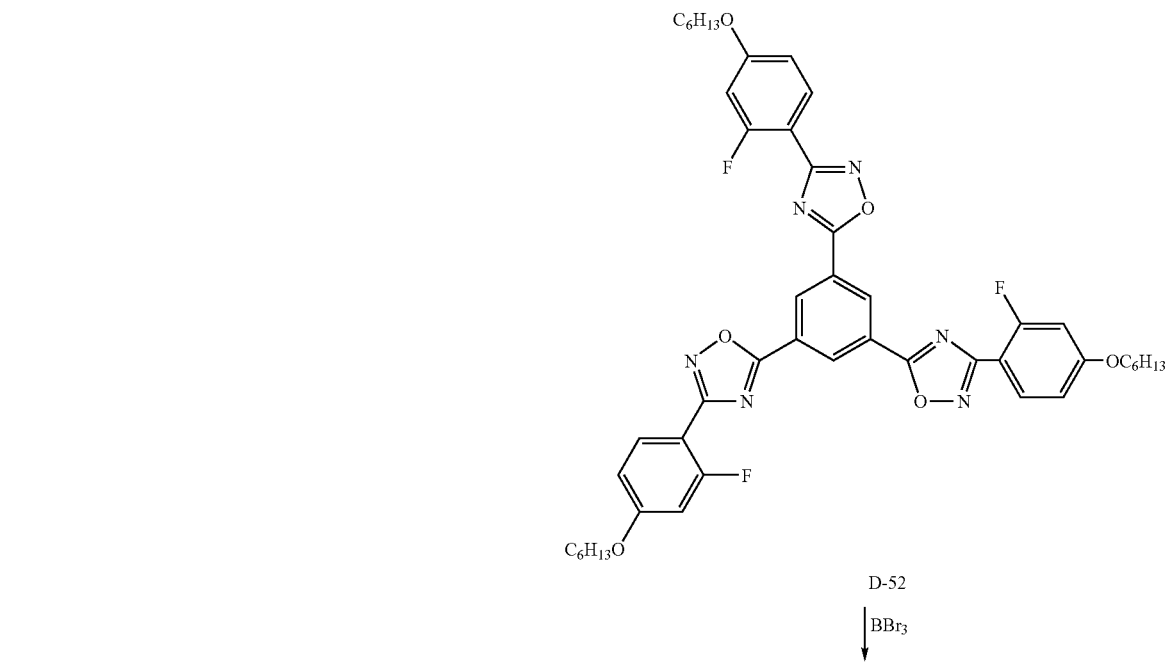
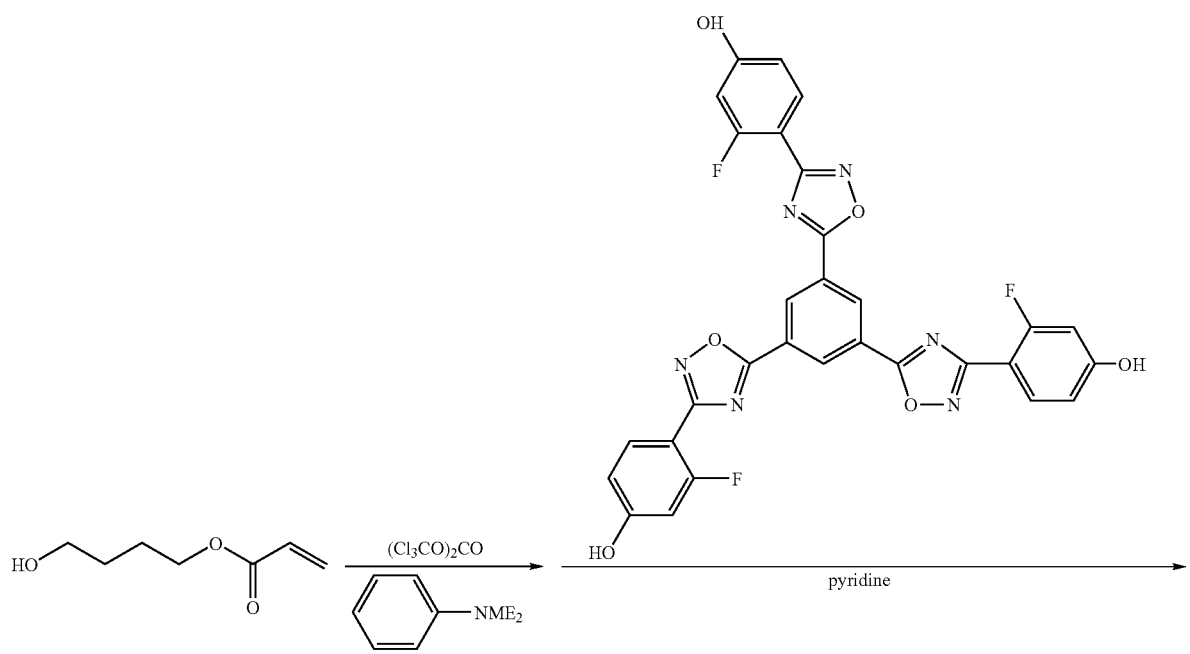

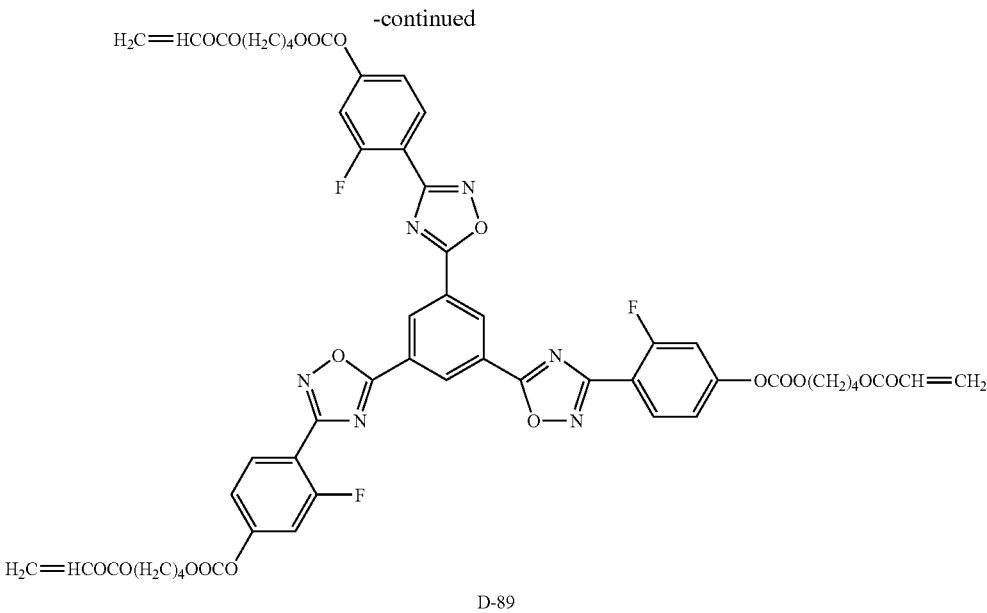

D-89

Using 4-hydroxybutyl acrylate as the raw material, a synthesis was performed in the same manner as in Synthesis Example 1 to obtain 20 g of D-89.

$^1$H-NMR (solvent: $CDCl_3$, standard: tetramethylsilane) δ (ppm):

1.80-2.00 (12H, m)

4.25 (6H, t)

4.35 (6H, t)

5.85 (3H, dd)

6.15 (3H, dd)

6.45 (3H, dd)

7.25 (6H, d)

8.30 (3H, t)

9.25 (3H, s)

The phase transition temperature of D-89 obtained was examined by the texture observation through a polarizing microscope, as a result, the phase was changed from crystal phase to discotic nematic liquid phase in the vicinity of 85° C. in the course of elevation of the temperature and when the temperature exceeded 104° C., the phase was changed to isotropic liquid phase. That is, D-89 was found to express a discotic nematic liquid phase between 85° C. and 104° C.

Production 2 of Optically Anisotropic Layer (Liquid Crystalline Compound D-89):

An aqueous solution of PVA-203 (produced by Kuraray Co., Ltd.) was coated on a glass substrate and dried at 100° C. for 3 minutes. The thickness of PVA-203 was 0.5 μm. The following coating solution was spin-coated on this substrate having provided thereon a PVA-203 thin film, and then the substrate was placed in a thermostatic chamber at 90° C. After 5 minutes, an ultraviolet ray of 600 mJ was irradiated to fix the aligned state. Subsequently, the thin film was allowed to cool to room temperature and the aligned state thereof was observed by a polarizing microscope, as a result, it was found that the discotic liquid crystalline compound was oriented in a homeotropic alignment without defects. The thickness of the liquid crystalline compound layer was 3.3 μm. The wavelength dispersion property and Δn of the obtained optically anisotropic layer are shown together in Table 1 below.

| (Coating Solution) | |
|---|---|
| Liquid Crystalline Compound D-89 | 100 parts by mass |
| Air Interface Alignment Controlling Agent V-(1) | 0.2 parts by mass |
| Irgacure 907 (produced by Ciba Specialty Chemicals) | 3.0 parts by mass |
| Diethylthioxanthone | 1.0 part by mass |
| Methyl ethyl ketone | 250 parts by mass |

COMPARATIVE EXAMPLE 1

Production of Thin Film Formed by Uniformly Aligning Conventional Discotic Liquid Crystalline Compound The following coating solution was spin-coated on the substrate having provided thereon a PVA-203 thin film prepared above, and then the substrate was placed in a thermostatic chamber at 190° C. After 5 minutes, an ultraviolet ray of 600 mJ was irradiated to fix the aligned state. Subsequently, the thin film was allowed to cool to room temperature and the aligned state thereof was observed by a polarizing microscope, as a result, it was found that the discotic liquid crystalline compound was oriented in a homeotropic alignment without defects. The thickness of the liquid crystalline compound layer was 3.0 μm. The wavelength dispersion property and Δn of the obtained optically anisotropic layer are shown in Table 1 below.

| (Coating Solution) | |
|---|---|
| Liquid Crystalline Compound JD-1 shown below | 100 parts by mass |
| Air Interface Alignment Controlling Agent V-(1) | 0.2 parts by mass |
| Irgacure 907 (produced by Ciba Specialty Chemicals) | 3.0 parts by mass |
| Diethylthioxanthone | 1.0 part by mass |
| Methyl ethyl ketone | 250 parts by mass |

-continued (Coating Solution)

Liquid Crystalline Compound:

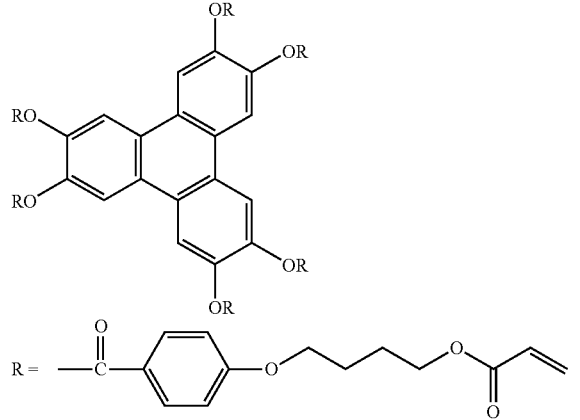

JD-1

[Comparison on Δn and Wavelength Dispersion Property]

The wavelength dispersion value (Re (478 nm) /Re (748 nm) of each thin film obtained in Synthesis Examples 1 and 2 and Comparative Example 1 was determined by measuring the retardation at 478 nm and 748 nm from an oblique angle of 40° with use of KOBRA 21ADH (manufactured by Oji Test Instruments).

Also, Δn can be determined by dividing Rth calculated in KOBRA 21ADH (manufactured by Oji Test Instruments) by the separately determined film thickness (d). Rth was determined by using a wavelength of 589 nm and by varying the observation angle (0°, −40°, +40°).

The results are shown in Table 1.

TABLE 1

|  | Liquid Crystalline Compound | Δn | Wavelength Dispersion Value |
| --- | --- | --- | --- |
| Synthesis Example 1 | Liquid Crystalline Compound D-38 (Invention) | 0.12 | 1.11 |
| Synthesis Example 2 | Liquid Crystalline Compound D-89 (Invention) | 0.11 | 1.10 |
| Comparative Example 1 | Liquid Crystalline Compound JD-1 (Comparison) | 0.09 | 1.18 |

It is seen that the liquid crystalline compound for use in the retardation plate of the present invention has high Δn and low wavelength dispersion property as compared with the conventional liquid crystalline compound.

In Examples below, retardation plates are produced by using the liquid crystalline compounds synthesized in Synthesis Examples 1 and 2.

EXAMPLE 3

Production of Transparent Support

A cellulose acetate solution (hereinafter sometimes referred to as a "dope") was prepared by charging the following components into a mixing tank and stirring these under heat.

| Composition of Cellulose Acetate Solution | |
| --- | --- |
| Cellulose acetate having an acetylation degree of 60.9% | 100 parts by mass |
| Triphenyl phosphate | 6.5 parts by mass |
| Biphenyl diphenyl phosphate | 5.2 parts by mass |
| Retardation Increasing Agent (1) shown below | 0.1 part by mass |
| Retardation Increasing Agent (2) shown below | 0.2 parts by mass |
| Methylene chloride | 310.25 parts by mass |
| Methanol | 54.75 parts by mass |
| 1-Butanol | 10.95 parts by mass |

Retardation Increasing Agent (1):

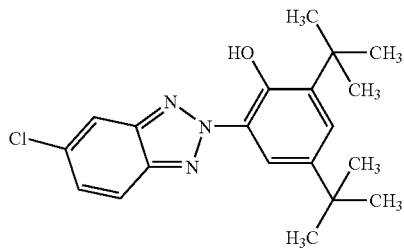

Retardation Increasing Agent (2):

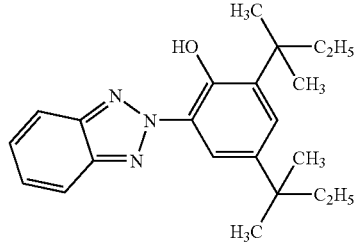

The dope prepared above was cast from a casting port on a drum cooled to 0° C. The film formed was peeled off in the state of having a solvent content of 70 mass % and after fixing both ends in the crosswise direction of the film by a pin tenter, the film was dried while keeping the distance of giving a stretch percentage of 3% in the crosswise direction (direction perpendicular to the machine direction) within the region where the solvent content was from 3 to 5 mass %. Thereafter, the film was further dried by transporting it between rollers of a heat-treating device and adjusted such that in the region of exceeding 120° C., the stretch percentage became substantially 0% and the ratio of the stretch percentage in the crosswise direction to the stretch percentage in the machine direction became 0.75 (by taking account of stretching of 4% in the machine direction at the peeling). In this way, a cellulose acetate film having a thickness of 100 μm was produced. The retardation value of the produced film was measured at a wavelength of 632.8 nm, as a result, the retardation value in the thickness direction was 40 nm and the in-plane retardation value was 4 nm. The produced cellulose acetate film was used as the transparent support.

(Formation of First Undercoat Layer)

On the transparent support prepared above, a coating solution having the following composition was coated in an amount of 28 ml/m² and dried to form a first undercoat layer.

| Composition of Coating Solution for First Undercoat Layer | |
|---|---|
| Gelatin | 5.44 parts by mass |
| Formaldehyde | 1.38 parts by mass |
| Salicylic acid | 1.62 parts by mass |
| Acetone | 391 parts by mass |
| Methanol | 158 parts by mass |
| Methylene chloride | 406 parts by mass |
| Water | 12 parts by mass |

(Formation of Second Undercoat Layer)

On the first undercoat layer, a coating solution having the following composition was coated in an amount of 7 ml/m² and dried to form a second undercoat layer.

| Composition of Coating Solution for Second Undercoat Layer | |
|---|---|
| Anionic polymer shown below | 0.77 parts by mass |
| Monoethyl ester citrate | 10.1 parts by mass |
| Acetone | 200 parts by mass |
| Methanol | 877 parts by mass |
| Water | 40.5 parts by mass |

Anionic Polymer:

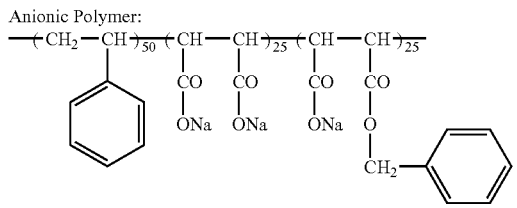

(Formation of Back Layer)

On the opposite surface of the transparent support, a coating solution having the following composition was coated in an amount of 25 ml/m² and dried to form a back layer.

| Composition of Coating Solution for Back Layer | |
|---|---|
| Cellulose diacetate having an acetylation degree of 55% | 6.56 parts by mass |
| Silica-base matting agent (average particle size: 1 μm) | 0.65 parts by mass |
| Acetone | 679 parts by mass |
| Methanol | 104 parts by mass |

(Formation of Orientation Film)

A modified polyvinyl alcohol shown below and glutaraldehyde (5 mass % of the modified polyvinyl alcohol) were dissolved in a methanol/water mixed solvent (volume ratio=20/80) to prepare a 5 mass % solution.

The solution prepared above was coated on the second undercoat layer, dried with hot air of 100° C. for 120 seconds and then rubbed to form an orientation film. The thickness of the obtained orientation film was 0.5 μm. The rubbing direction of the orientation film was parallel to the casting direction of the transparent support.

(Formation of Optically Anisotropic Layer)

On the rubbing-treated surface of the orientation film produced above, a coating solution for optically anisotropic layer having the following composition was coated by using a wire bar.

| Coating Solution for Optically Anisotropic Layer | |
|---|---|
| Liquid Crystalline Compound for use in the present invention (D-38) | 100 parts by mass |
| Photopolymerization Initiator (Irgacure 907, produced by Ciba Specialty Chemicals) | 2.0 parts by mass |
| Air Interface Alignment Controlling Agent (KK-1) shown below | 0.2 parts by mass |
| Orientation Film Interface Alignment Controlling Agent (HK-1) shown below | 0.05 parts by mass |
| Methyl ethyl ketone | 270 parts by mass |

Air Interface Alignment Controlling Agent (KK-1):

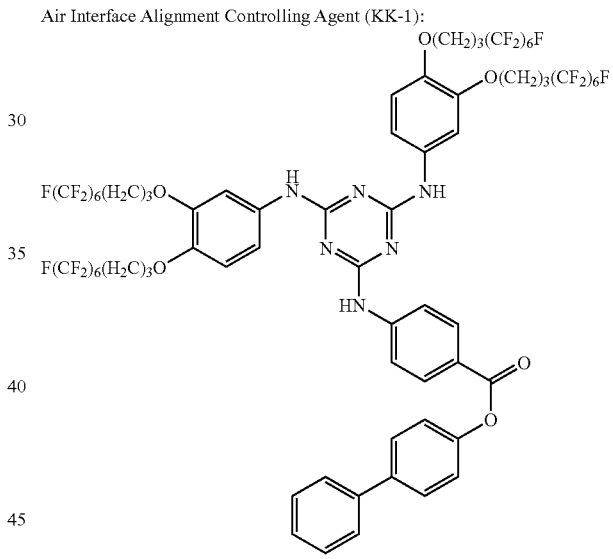

Orientation Film Interface Alignment Controlling Agent (HK-1):

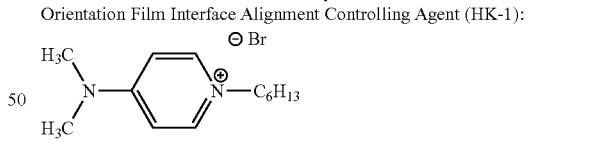

The thus-produced film having coated thereon an optically anisotropic layer was subjected to alignment in a thermostatic chamber and after irradiating an ultraviolet ray of 200 mJ/cm² to fix the aligned state of the optically anisotropic layer, the film was allowed to cool to room temperature, whereby a retardation plate was produced. The thickness of the optically anisotropic layer formed was about 1.1 μm.

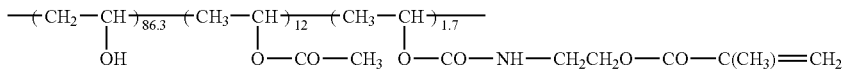

EXAMPLE 4

Formation of Optically Anisotropic Layer

On the rubbing-treated surface of the orientation film produced above, a coating solution for optically anisotropic layer having the following composition was coated by using a wire bar.

| Coating Solution for Optically Anisotropic Layer | |
|---|---|
| Liquid Crystalline Compound for use in the present invention (D-89) | 100 parts by mass |
| Photopolymerization Initiator (Irgacure 907, produced by Ciba Specialty Chemicals) | 3.3 parts by mass |
| Sensitizer (Kayacure DETX, produced by Nippon Kayaku Co., Ltd.) | 1.1 parts by mass |
| Air Interface Alignment Controlling Agent (KK-1) | 0.2 parts by mass |
| Orientation Film Interface Alignment Controlling Agent (HK-1) | 0.05 parts by mass |
| Methyl ethyl ketone | 270 parts by mass |

The thus-produced film having coated thereon an optically anisotropic layer was subjected to alignment in a thermostatic chamber and after irradiating an ultraviolet ray of 200 mJ/cm$^2$ to fix the aligned state of the optically anisotropic layer, the film was allowed to cool to room temperature, whereby a retardation plate was produced. The thickness of the optically anisotropic layer formed was about 1.1 µm.

COMPARATIVE EXAMPLE 2

On the orientation film produced in Example 4, a coating solution for optically anisotropic layer having the following composition was coated by using a wire bar.

| Coating Solution for Optically Anisotropic Layer | |
|---|---|
| Comparative Liquid Crystalline Compound (JD-1) | 100 parts by mass |
| Ethylene oxide-modified trimethylolpropane triacrylate (V#360, produced by Osaka Organic Chemical Industry Ltd.) | 9.9 parts by mass |
| Photopolymerization Initiator (Irgacure 907, produced by Ciba Specialty Chemicals) | 3.3 parts by mass |
| Sensitizer (Kayacure DETX, produced by Nippon Kayaku Co., Ltd.) | 1.1 parts by mass |
| Cellulose acetate butyrate (CAB551-0.2, produced by Eastman Chemical) | 2.2 parts by mass |
| Cellulose acetate butyrate (CAB531-1, produced by Eastman Chemical) | 0.55 parts by mass |
| Methyl ethyl ketone | 250 parts by mass |

The thus-produced film having coated thereon an optically anisotropic layer was subjected to alignment and after irradiating an ultraviolet ray of 200 mJ/cm$^2$ to fix the aligned state of the optically anisotropic layer, the film was allowed to cool to room temperature, whereby a retardation plate was produced. The thickness of the optically anisotropic layer formed was about 1.40 µm.

[Evaluation of Retardation Plate]

(Measurement of Re and Rth)

Re(589 nm) and Rth(589 nm) indicate the in-plane retardation and the retardation in the thickness direction at a wavelength of λ, respectively. The Re(589 nm) of each retardation plate obtained in Examples 3 and 4 and Comparative Example 1 is measured by injecting light at a wavelength of 589 nm to the film normal direction in KOBRA-21ADH (manufactured by Oji Test Instruments). Rth(589 nm) is calculated by KOBRA-21ADH based on retardation values measured in totally three directions, that is, the above-described Re(589 nm), a retardation value measured by injecting light at a wavelength of λ nm from the direction inclined at +40° with respect to the film normal direction by using the slow axis (judged by KOBRA-21ADH) in the plane as the inclination axis (rotation axis), and a retardation value measured by injecting light at a wavelength of λ nm from the direction inclined at −40° with respect to the film normal direction by using the slow axis in the plane as the inclination axis (rotation axis). The results are shown in Table 2.

An ultrathin section was produced by cutting the cross section of each retardation plate obtained in Examples 3 and 4 and Comparative Example 1 with use of a microtom and observed through a polarizing microscope, as a result, it could be confirmed that the optically anisotropic layer of each retardation plate obtained in Examples 3 and 4 and Comparative Example 1 was hybrid-aligned.

(Production of Liquid Crystal Device)

A polyimide orientation film was provided on a glass substrate having thereon an ITO electrode and subjected to a rubbing treatment. Two sheets of the obtained glass substrate were disposed through a 5-µm spacer such that the orientation film surfaces were opposed each other and the rubbing directions of the orientation films came to run at right angles. In the gap between two substrates, rod-like liquid crystal molecules (ZL4792, produced by Merck & Co., Inc.) were injected to form a rod-like liquid crystal layer. The Δn of the rod-like liquid crystal molecule was 0.0969. On both sides of the thus-produced TN liquid crystal cell, two sheets of the retardation plate produced above were disposed and attached such that the optically anisotropic layer came to face the liquid crystal cell substrate. Furthermore, two sheets of a polarizing plate were attached to the outer sides of respective retardation plates, thereby producing a liquid crystal display device. The retardation plates and the polarizing plates were arranged such that the rubbing direction of the orientation film of the retardation plate came to run in non-parallel to the rubbing direction of the orientation film of the liquid crystal cell adjacent thereto and such that the absorption axis of the polarizing plate came to run in parallel to the rubbing direction of the liquid crystal cell.

A voltage was applied to the liquid crystal cell of each liquid crystal display device produced, and by defining the contrast ratio as a ratio of transmittance between white display and black display at a white display voltage of 2 V and a black display voltage of 5 V, the region having a contrast ratio of on up/down and right/left sides and being free from occurrence of gradation reversal was measured as the viewing angle. Also, the angle dependency of the color tint in white display as well as in black display was examined with an eye. The results obtained are shown in Table 2.

TABLE 2

| Retardation Plate | Wavelength Dispersion | Re | Rth | Viewing Angle Up/Down | Viewing Angle Right/Left | Change of Color Tint |
|---|---|---|---|---|---|---|
| Example 1 | 1.11 | 34 nm | 157 nm | 95° | 147° | not recognized |
| Example 2 | 1.10 | 35 nm | 158 nm | 95° | 147° | not recognized |
| Comparative Example 2 | 1.18 | 34 nm | 157 nm | 92° | 145° | recognized |

It can be confirmed that the retardation plate (Examples 3 and 4) of the present invention causes less change in the color tint as compared with the retardation plate (Comparative Example 2) using the conventional liquid crystalline compound.

The invention claimed is:

1. A retardation plate comprising at least one optically anisotropic layer, wherein at least one of said optically anisotropic layers is formed from a composition containing a liquid crystalline compound represented by the following formula (DI):

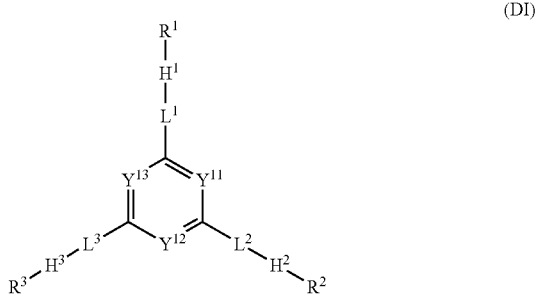

(DI)

wherein $Y^{11}$, $Y^{12}$ and $Y^{13}$ each independently represent a methine group or a nitrogen atom; $L^1$, $L^2$ and $L^3$ each independently represent a single bond or a divalent linking group; $H^1$, $H^2$ and $H^3$ each independently represent a group represented by the following formula (DI-A) or (DI-B); $R^1$, $R^2$ and $R^3$ each independently represent a group represented by the following formula (DI-R):

(DI-A)

wherein $YA^1$ and $YA^2$ each independently represent a methine group or a nitrogen atom; XA represents an oxygen atom, a sulfur atom, a methylene group or an imino group; * indicates the position at which the group of formula (DI-A) bonds to any of $L^1$ to $L^3$ in formula (DI); ** indicates the position at which the group of formula (DI-A) bonds to any of $R^1$ to $R^3$ in formula (DI),

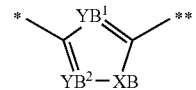

(DI-B)

wherein $YB^1$ and $YB^2$ each independently represent a methine group or a nitrogen atom; XB represents an oxygen atom, a sulfur atom, a methylene group or an imino group; * indicates the position at which the group of formula (DI-B) bonds to any of $L^1$ to $L^3$ in formula (DI); ** indicates the position at which the group of formula (DI-B) bonds to any of $R^1$ to $R^3$ in formula (DI), $$*\text{-}(\text{-}L^{21}\text{-}Q^2)_{n1}\text{-}L^{22}\text{-}L^{23}\text{-}Q^1 \quad \text{(DI-R)}$$

wherein * indicates the position at which the group of formula (DI-R) bonds to any of $H^1$ to $H^3$ in formula (DI); $L^{21}$ represents a single bond or a divalent linking group; $Q^2$ represents a divalent group having at least one cyclic structure; n1 indicates an integer of from 0 to 4; $L^{22}$ represents —O—, —O—CO—, —CO—O—, —O—CO—O—, —S—, —NH—, —SO$_2$—, —CH$_2$—, —CH=CH— or —C≡C—; ** indicates the position at which the group bonds to $Q^2$; $L^{23}$ represents a divalent linking group selected from —O—, —S—, —C(=O)—, —SO$_2$—, —NH—, —CH$_2$—, —CH=CH— and —C≡C— and their combinations, and when the divalent linking group contains a hydrogen atom, then the hydrogen atom may be substituted with a substituent; $Q^1$ represents a polymerizable group or a hydrogen atom, and when the polymerizable group contains a hydrogen atom, then the hydrogen atom may be substituted with a substituent; when n1 is 2 or more, then plural (-$L^{21}$-$Q^2$)'s may be the same or different.

2. The retardation plate of claim 1, wherein in formula (DI), $Y^{11}$, $Y^{12}$ and $Y^{13}$ are all methine groups.

3. The retardation plate of claim 1, wherein in formula (DI), $L^1$, $L^2$ and $L^3$ each independently represent a single bond, *—O—CO—, *—CO—O—, *—CH=CH—, *C≡C—, *-divalent cyclic group-, *—O—CO-divalent cyclic group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH— or *-divalent cyclic group-C≡C— in which * indicates the position at which the group bonds to the 6-membered ring that contains $Y^{11}$, $Y^{12}$ and $Y^{13}$ in formula (DI).

4. The retardation plate of claim 1, wherein in formula (DI-A), at least one of $YA^1$ and $YA^2$ is a nitrogen atom.

5. The retardation plate of claim 1, wherein in formula (DI-A), XA is an oxygen atom.

6. The retardation plate of claim 1, wherein in formula (DI-B), at least one of $YB^1$ and $YB^2$ is a nitrogen atom.

7. The retardation plate of claim 1, wherein in formula (DI-B), XB is an oxygen atom.

8. The retardation plate of claim 1, wherein in formula (DI-R), $L^{21}$ is a single bond, *—O—CO—, *—CO—O—, *—CH=CH— or *—C≡C— in which *** indicates the position at which the group bonds to the side of * in formula (DI-R).

9. The retardation plate of claim 1, wherein in formula (DI-R), $Q^2$ is a benzene ring, a naphthalene ring, an anthracene ring, a phenanthrene ring, a cyclohexane ring, a pyridine ring or a pyrimidine ring.

10. The retardation plate of claim 1, wherein in formula (DI-R), $L^{22}$ is —O—, —O—CO—, —O—CO—O— or —CH$_2$— in which ** indicates the position at which the group bonds to $Q^2$.

11. The retardation plate of claim 1, wherein in formula (DI-R), $L^{23}$ is —O—, —C(=O)—, —CH$_2$—, —CH=CH—, —C≡C— or their combination.

12. The retardation plate of claim 1, wherein in formula (DI), $Q^1$ is a polymerizable group.

13. A retardation plate comprising at least one optically anisotropic layer, wherein at least one of said optically anisotropic layers is formed from a composition containing a liquid crystalline compound represented by the following formula (DII):

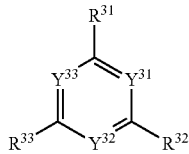

(DII)

wherein $Y^{31}$, $Y^{32}$ and $Y^{33}$ each independently represent a methine group or a nitrogen atom; $R^{31}$, $R^{32}$ and $R^{33}$ each independently represents the following formula (DII-R):

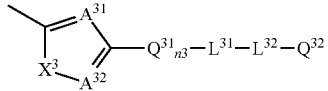

(DII-R)

wherein $A^{31}$ and $A^{32}$ each independently represent a methine group or a nitrogen atom; $X^3$ represents an oxygen atom, a sulfur atom, a methylene group or an imino group; $Q^{31}$ represents a 6-membered cyclic structure-having divalent linking group; n3 indicates an integer of from 1 to 3; $L^{31}$ represents *—O—, *—O—CO—, *—CO—O—, *—O—CO—O—, *—NH—, *—SO$_2$—, *—CH$_2$—, *—CH=CH— or *—C≡C—; * indicates the position at which the group bonds to $Q^{31}$; $L^{32}$ represents a divalent linking group selected from —O—, —S—, —C(=O)—, —SO$_2$—, —NH—, —CH$_2$—, —CH=CH— and —C≡C— and their combinations, and when the divalent linking group contains a hydrogen atom, then the hydrogen atom may be substituted with a substituent; $Q^{32}$ represents a polymerizable group or a hydrogen atom, and when the polymerizable group contains a hydrogen atom, then the hydrogen atom may be substituted with a substituent; when n3 is 2 or more, then plural $Q^{31}$'s may be the same or different.

14. The retardation plate of claim 13, wherein in formula (DII-R), $A^{31}$ and $A^{32}$ are both nitrogen atoms, and $X^3$ is an oxygen atom.

15. The retardation plate of claim 13, wherein in formula (DII-R), $Q^{31}$ has a benzene ring.

16. The retardation plate of claim 1, wherein the optically anisotropic layer is formed from a hybrid-aligned liquid crystalline compound.

17. An elliptically polarizing plate comprising the retardation plate of claim 1 and a polarizing film.

18. A liquid crystal display device comprising the retardation plate of claim 1.

* * * * *